(12) United States Patent
LeBlanc et al.

(10) Patent No.: US 11,549,369 B1
(45) Date of Patent: Jan. 10, 2023

(54) MEASUREMENT SYSTEM WITH DISPOSABLE FIBER WITH STRAIN COUPLING IN LATERAL WELLS

(71) Applicant: Halliburton Energy Services, Inc., Houston, TX (US)

(72) Inventors: Michel LeBlanc, Houston, TX (US); Mikko K Jaaskelainen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/643,755

(22) Filed: Dec. 10, 2021

(51) Int. Cl.
*E21B 49/00* (2006.01)
*G01L 1/24* (2006.01)
*E21B 43/26* (2006.01)

(52) U.S. Cl.
CPC ........ *E21B 49/006* (2013.01); *E21B 43/2607* (2020.05); *G01L 1/242* (2013.01)

(58) Field of Classification Search
CPC ....... E21B 49/006; E21B 17/206; G01L 1/242
See application file for complete search history.

(56) References Cited

U.S. PATENT DOCUMENTS

| | | | |
|---|---|---|---|
| 11,131,185 B1 | 9/2021 | Jaaskelainen et al. | |
| 11,300,698 B2* | 4/2022 | McColpin | G01V 1/288 |
| 2003/0075361 A1* | 4/2003 | Terry | E21B 47/01 |
| | | | 175/171 |
| 2014/0345388 A1* | 11/2014 | Den Boer | G01H 9/006 |
| | | | 385/13 |
| 2015/0075775 A1 | 3/2015 | Davidson et al. | |
| 2016/0220131 A1* | 8/2016 | Kishida | A61B 5/7278 |
| 2017/0074998 A1* | 3/2017 | McColpin | G01V 1/42 |
| 2017/0260847 A1 | 9/2017 | Xia et al. | |
| 2018/0187543 A1 | 7/2018 | Wilson et al. | |
| 2018/0348017 A1* | 12/2018 | Freeland | G10K 11/30 |

(Continued)

FOREIGN PATENT DOCUMENTS

WO 2018070980 A1 4/2018

OTHER PUBLICATIONS

International Search Report and Written Opinion dated Aug. 23, 2022 for corresponding PCT Patent Application No. PCT/US2022/070023 filed on Jan. 4, 2022.

(Continued)

*Primary Examiner* — Shane Bomar
(74) *Attorney, Agent, or Firm* — K&L Gates LLP

(57) ABSTRACT

A wellbore optical fiber measurement system for measuring data in a lateral wellbore that includes a flexible optical fiber. The optical fiber includes a waveguide coated with a coating, wherein the optical fiber has an effective density $\rho_{eff_{fiber}}$ and an effective axial Young modulus $E_{eff_{fiber}}$ and wherein the product $$\left(\frac{\rho_{eff_{fiber}}}{E_{eff_{fiber}}}\right)\cdot\left(1-\frac{\rho_{water}}{\rho_{eff_{fiber}}}\right)$$

is greater than 50 kg/m3/GPa. The system also includes a data acquisition unit with a processor operable to obtain strain measurement data of the wellbore from the optical fiber.

20 Claims, 9 Drawing Sheets

(56) References Cited

U.S. PATENT DOCUMENTS

| | | | |
|---|---|---|---|
| 2019/0010803 A1 | 1/2019 | Purkis | |
| 2019/0284890 A1* | 9/2019 | Purkis | |
| 2020/0123052 A1* | 4/2020 | Schwartz | G01K 11/32 |
| 2020/0165097 A1 | 5/2020 | Purkis | |
| 2020/0340319 A1 | 10/2020 | Purkis | |
| 2021/0032979 A1 | 2/2021 | Granville et al. | |
| 2021/0040841 A1 | 2/2021 | Dusterhoft et al. | |
| 2021/0131276 A1 | 5/2021 | LeBlanc et al. | |
| 2021/0189874 A1 | 6/2021 | Jaaskelainen et al. | |
| 2021/0332683 A1* | 10/2021 | Hunter | E21B 43/267 |
| 2021/0372906 A1* | 12/2021 | LeBlanc | E21B 49/0875 |

OTHER PUBLICATIONS

Paul Higginson et al., Advancing The Application of Downhole Fibre Optics with a Novel Low Cost Disposable Deployment Method, Sep. 5-8, 2017, 9, 2017.

\* cited by examiner

MEASUREMENT SYSTEM WITH DISPOSABLE FIBER WITH STRAIN COUPLING IN LATERAL WELLS

BACKGROUND

In the oil and gas industry, the generation and management of wells includes measuring the properties and events associated with the wells and the formations in which the wells are located. Several techniques can be used to monitor and measure the properties and events associated with the wells. The techniques include the use of distributed temperature sensing (DTS) and distributed acoustic sensing (DAS) systems using an optical fiber deployed in the well. DTS and DAS systems are commonly used to locate the source of production fluids within a wellbore, identify fluid placement by measuring formation temperature warm back, leak detection, cross flow, sand and proppant movement and placement, sand-out, seismic events, and micro-seismic events, etc.

Distributed acoustic sensing (DAS) is used to estimate the relative efficiency of perforations in hydraulic fracturing jobs, and for seismic sensing in various vertical seismic profiling (VSP) methodologies. One application particularly relevant to hydraulic fracturing is the use of a DAS fiber optic cable deployed in a well to detect microseismic events generated by the treatment of another (and sometimes, the same) well. The useful frequency range in DAS microseismic signals is typically 10 Hz to 1000 Hz.

Microseismic events occurring in the rock formations where hydraulic fracturing is happening are traditionally observed using a geophone array deployed in one or more observation wells. As an alternative to geophones, a fiber optic cable attached to, or deployed in a wellbore and interrogated using DAS can be used, with the advantage of providing seismic data simultaneously over the full extent of the well, albeit only for motion in the direction coaxial with the optical fiber.

More recently, the low-frequency component of the DAS signal (LF-DAS) (<1 Hz), has been used to measure strain changes inside the wellbore, particularly for crosswell strain monitoring of hydraulic fracturing jobs. In this application, the fiber optic cable is attached to, or laid inside a well and used to observe the treatment of one or more nearby wells.

Crosswell strain measurements using a fiber optic cable deployed in an observation well allow a user to better understand the location and extent of fractures originating from one or more nearby wells being hydraulically fractured. Analytics include treatment volumes needed, growth of fractures over time, fracture azimuth, etc., for a detailed picture of how and when connection with offset wells are established.

When wells are placed sufficiently close together, stimulation of one well may impact the stimulation and/or production of other wells if fluid communication between the wells is present. This may be referred to generally as "frac hits" and occurs because the stimulated well is in fluid communication with one or more of the nearby wells.

For both the crosswell strain and microseismic monitoring applications, it is essential that good strain coupling exist between the wellbore and the optical fiber cable.

It is expected that a fiber optic cable attached outside of the casing of an observation well will provide good strain coupling to detect the signals coming from propagating acoustic waves in the rock or from approaching hydraulically induced fracture tips. This is especially so when the casing is cemented to the wellbore, as is the industry practice. However, cemented-behind-casing is only one of the numerous ways for deploying optical fibers inside a wellbore. A wireline or slickline cable with one or more integrated optical fibers can be temporarily deployed in a well and pulled into the horizontal (lateral) section by use of a tractor. Even though not attached to the wellbore, strain coupling may still take place between the wellbore and the cable, in the horizontal section of the wellbore, where the cable can rest on the bottom surface and interact with the wellbore by Coulomb friction.

A lower-cost approach has been recently introduced for fiber deployment in a wellbore: the use of a disposable optical fiber With disposable optical fiber, the optical fiber is not protected by typical outer protective jackets or coverings of a fiber optic cable. FIG. 1 is a schematic representation of a cross section of a typical flexible optical fiber 100 in the prior art. The glass waveguide 101, with diameter of 125 μm, with higher refractive index core 102 within a cladding is surrounded by a primary acrylate coating 103 and a secondary acrylate coating 104 with typical diameter 242 μm. The secondary acrylate coating 104 has a higher elastic modulus compared to the primary acrylate coating 103 in order to reduce microbending attenuation in the optical fiber. These waveguide and coating dimensions are the most common in the fiber optic industry, resulting in a fiber of very low cost.

The disposable optical fiber is deployed into the well by the transport of a special shuttle tool in which a thin optical fiber is spooled on a pay-out bobbin. To push the shuttle to the end of the horizontal section, a dart is attached to the leading end of the shuttle and the pressure from fluid being pumped from the surface of the well pushes the dart towards the full depth of the horizontal well. The thin optical fiber provides a temporary medium for DTS and DAS measurements over the full length of the wellbore. The concern with this deployment method is whether sufficient strain coupling can be obtained for microseismic monitoring or crosswell strain monitoring. The optical fiber can be coated with a tacky material in the pay-out bobbin to promote its adhesion to the wellbore. This approach can be effective for crosswell and microseismic monitoring for the section of the optical fiber deployed in the horizontal (lateral) section of the well. It is clear, however, that the approach could be improved if the optical fiber had a greater propensity to sink to touch more uniformly the bottom surface of the horizontal wellbore.

The effectiveness of the tacky substance may also be affected by interaction with the wellbore fluid. For example, hydrocarbons in the wellbore can act as a solvent to dilute or otherwise reduce the effectiveness of the tacky substance. In such case, strain coupling will need to rely on Coulomb friction alone. Another relevant aspect is that the use of a coated fiber can require a higher tension in the optical fiber to overcome viscous forces in the deployment canister itself. Tension in the optical fiber increases the likelihood that the optical fiber will rest at discrete high points along the wellbore and be suspended between those high points. A more desirable outcome is for the fiber's weight to force it to rest on the bottom surface of the wellbore. However, such improved contact should not be at the expense of increasing the stiffness of the optical fiber to such a degree that likelihood of slippage between the optical fiber in the wellbore is increased instead of reduced.

In short, because of the convenience and low-cost of the disposable fiber approach, there is a need in the oil and gas industry to improve the interaction between the optical fiber and the wellbore to secure good strain coupling.

BRIEF DESCRIPTION OF THE DRAWINGS

Embodiments of the measurement system with disposable fiber with strain coupling in lateral wells are described with reference to the following figures. The same or sequentially similar numbers are used throughout the figures to reference like features and components. The features depicted in the figures are not necessarily shown to scale. Certain features of the embodiments may be shown exaggerated in scale or in somewhat schematic form, and some details of elements may not be shown in the interest of clarity and conciseness.

DETAILED DESCRIPTION

The present disclosure describes embodiments of measurement systems and methods for measuring wellbore static and dynamic strain in a horizontal wellbore using a flexible disposable optical fiber with improved strain coupling. "Flexible" means that the bending moments sustained by the optical fiber cannot be large enough to prevent the optical fiber from predominantly resting at the bottom of the horizontal wellbore, nor do the bending moments prevent the action of a conveyance device from straightening the optical fiber in the wellbore. In addition to being flexible, the optical fiber has a linear density sufficient to establish contact between the wellbore wall and the optical fiber due to the weight of the optical fiber, while, at the same time, having sufficient compliance that strain gradients can be transferred to the optical fiber without slippage.

Embodiments of the measurement systems and methods may be used in monitoring the fracturing of a well from an adjacent monitoring well. The optical fiber can also be deployed in the monitoring well with very little relative cost since the optical fiber is not being permanently installed in the well. The optical fiber may also include optional point sensors located at the distal end of the optical fiber or placed at selected points along the optical fiber.

The present disclosure also relates to a fracturing treatment optimization system and, more particularly, to a fracturing treatment optimization system comprising well interference sensing using an optical fiber to measure one or more of crosswell fluid interaction data, micro-deformation strain data, microseismic data, and distributed strain data from multiple locations along a wellbore. The data may be analyzed and used to in a subsurface fracture network model to measure and predict future fracture growth, hydraulic pressure, poroelastic pressure, strain, stress, and related completion effects. The systems and methods enable real-time and automated monitoring and analysis of treatment and monitoring wells and provide suggestions and effect modifications to optimize treatment of the treatment and monitoring wells.

To facilitate a better understanding of the present disclosure, the following examples of one or more embodiments are given. In no way should the following examples be read to limit or define the scope of the disclosure. Embodiments of the present disclosure may be applicable to horizontal, deviated, or otherwise non-vertical or nonlinear wellbores in any type of subterranean formation. Embodiments may be applicable to injection wells as well as production wells, including hydrocarbon wells.

Figure 1:
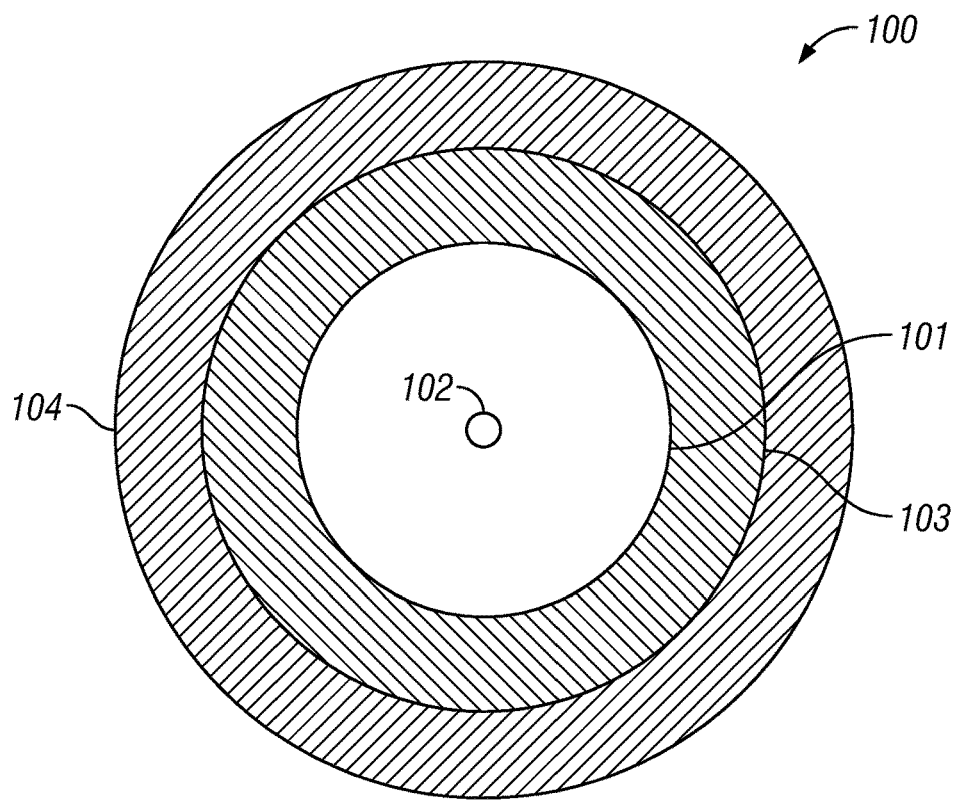
FIG. 1 is a schematic representation of a cross section of an example optical fiber in the prior art.
Figure 2:
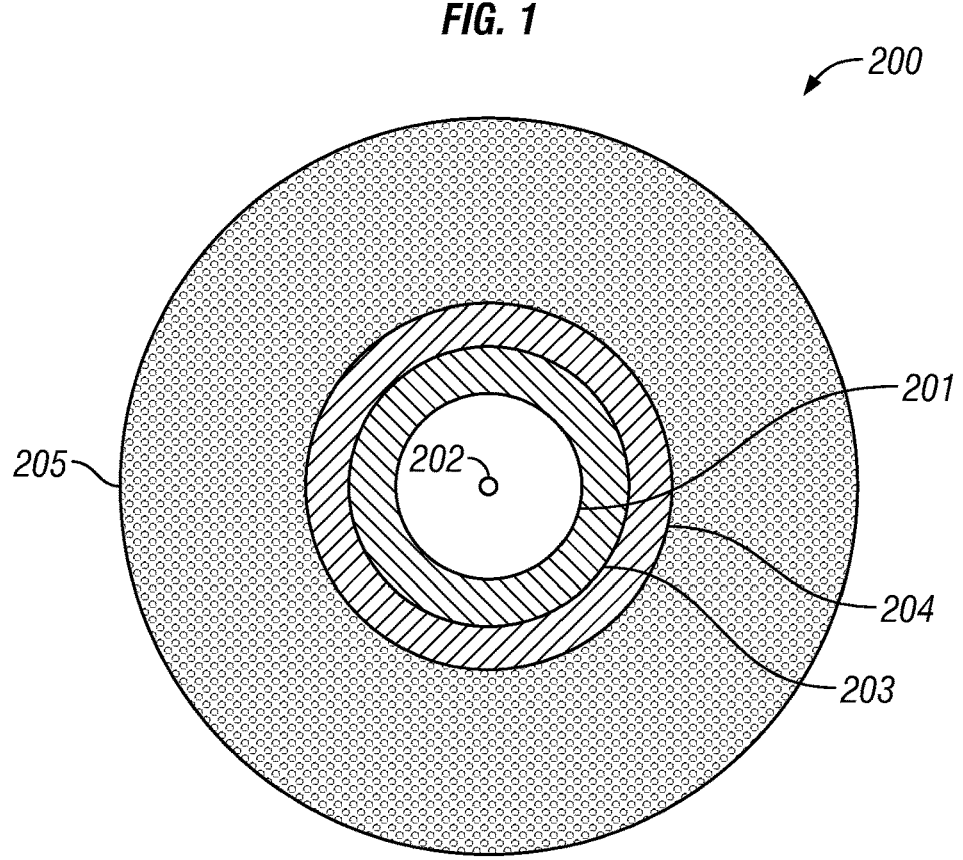
FIG. 2 is a schematic representation of a cross section of an example optical fiber, in accordance with one or more embodiments.

FIG. 2 is a schematic representation of a cross section of a flexible optical fiber 200 in accordance with various embodiments now described. The waveguide of the fiber 200 is the same as in FIG. 1 and includes a glass waveguide 201 that includes a higher refractive index core 202 within a cladding, to which is added an additional coating layer 205. The material for the coating layer 205 can be selected based on its strain coupling efficiency properties. For example, materials that increase the linear density of the fiber 200 without significantly increasing the optical fiber stiffness will improve the strain coupling between the wellbore and the optical fiber.

In considering appropriate materials for fiber coating 205, the strain coupling between the optical fiber and the bottom wall of a wellbore may be modeled. A conservative assumption to make to describe the strain coupling between a flexible optical fiber and the wellbore in the horizontal section (lateral portion) of an oil well is via Coulomb friction. In this case, the maximum strain gradient that will be transferred to the optical fiber is obtained by the following equation:

$$\left|\frac{d\varepsilon}{dz}\right|_{max} = \mu \cdot K_{\varepsilon F} \cdot \left(w_{fiber} - \rho_{fluid} g\left(\frac{\pi D_c^2}{4}\right)\right) \quad \text{Eq. (1)}$$

where:
$w_{fiber}$=fiber linear weight
$\rho_{fluid}$=density of the wellbore fluid
$D_c$=fiber outer diameter
$\mu$=coefficient of friction
g=acceleration due to gravity (9.81 m/s$^2$)
$K_{\varepsilon F}$=fiber stretch coefficient In Equation 1, a high value for the maximum strain gradient signifies better strain coupling.

For a multi-layer coated optical fiber, the stretch coefficient is obtained as:

$$K_{\varepsilon F} = \frac{1}{\sum A_j E_j} = \frac{1}{\left(\frac{\pi D_c^2}{4}\right) \cdot E_{\mathit{eff\,fiber}}} \quad \text{Eq. (2)}$$

where:
 $A_j$=cross-sectional area of fiber layer j
 $E_j$=Axial Young's modulus of fiber layer j $$E_{\mathit{eff\,fiber}} = \frac{\sum A_j E_j}{\left(\frac{\pi D_c^2}{4}\right)}$$

Likewise, the linear weight of a multi-layer coated optical fiber is obtained as:

$$w_{\mathit{fiber}} = g \sum A_j \cdot \rho_j = g \left(\frac{\pi D_c^2}{4}\right) \rho_{\mathit{eff\,fiber}} \quad \text{Eq. (3)}$$

where:
 $\rho_j$=density of fiber layer j $$\rho_{\mathit{eff\,fiber}} = \frac{\sum A_j \cdot \rho_j}{\left(\frac{\pi D_c^2}{4}\right)}$$

With those relations, Eq. 1 can be written as follows:

$$\left|\frac{d\varepsilon}{dz}\right|_{max} = \mu \cdot g \cdot \left(\frac{\rho_{\mathit{eff\,fiber}}}{E_{\mathit{eff\,fiber}}}\right) \cdot \left(1 - \frac{\rho_{\mathit{fluid}}}{\rho_{\mathit{eff\,fiber}}}\right) \quad \text{Eq. (4)}$$

From Eq. (4), the product $$\left(\frac{\rho_{\mathit{eff\,fiber}}}{E_{\mathit{eff\,fiber}}}\right) \cdot \left(1 - \frac{\rho_{\mathit{fluid}}}{\rho_{\mathit{eff\,fiber}}}\right)$$

may be referred to as the strain coupling parameter. The $$\left(1 - \frac{\rho_{\mathit{fluid}}}{\rho_{\mathit{eff\,fiber}}}\right)$$

factor of the strain coupling parameter depends on the wellbore fluid. In many applications, the fluid is water ($\rho_{\mathit{fluid}}$=1000 kg/m³). Since for design purposes we need to make an assumption on the fluid present, we will use water as the reference wellbore fluid.

Table 1 provides dimension and material properties for a standard disposable fiber according to the current art:

TABLE 1

| Material | Layer | Diameter (μm) | Modulus (GPa) | Density (kg/m³) |
|---|---|---|---|---|
| Silica | Waveguide | 125 | 70.3 | 2196 |
| Soft Acrylate | Primary Coating | 190 | 0.010 | 1150 |
| Hard Acrylate | Secondary Coating | 242 | 0.900 | 1150 |

TABLE 1-continued

Using the data in Table 1 and the definitions above, the standard disposable fiber has the following properties: $\rho_{\mathit{eff\,fiber}}$=1429 kg/m³ and $E_{\mathit{eff\,fiber}}$=19.025 GPa, resulting in a $$\frac{\rho_{\mathit{eff\,fiber}}}{E_{\mathit{eff\,fiber}}} = 75.11 \text{ kg/m}^3/\text{GPa}, \left(1 - \frac{\rho_{\mathit{water}}}{\rho_{\mathit{eff\,fiber}}}\right) = 0.300,$$

such that the $$\left(\frac{\rho_{\mathit{eff\,fiber}}}{E_{\mathit{eff\,fiber}}}\right) \cdot \left(1 - \frac{\rho_{\mathit{fluid}}}{\rho_{\mathit{eff\,fiber}}}\right)$$

product is equal to 22.55 kg/m³/GPa. This corresponds to a maximum strain gradient (from Eq. 4, using μ=0.3 and $\rho_{\mathit{fluid}}=\rho_{\mathit{water}}$=1000 kg/m³) of $$\left|\frac{d\varepsilon}{dz}\right|_{max} = 66.4 \text{ μ}\varepsilon/\text{km}.$$

Figure 3:
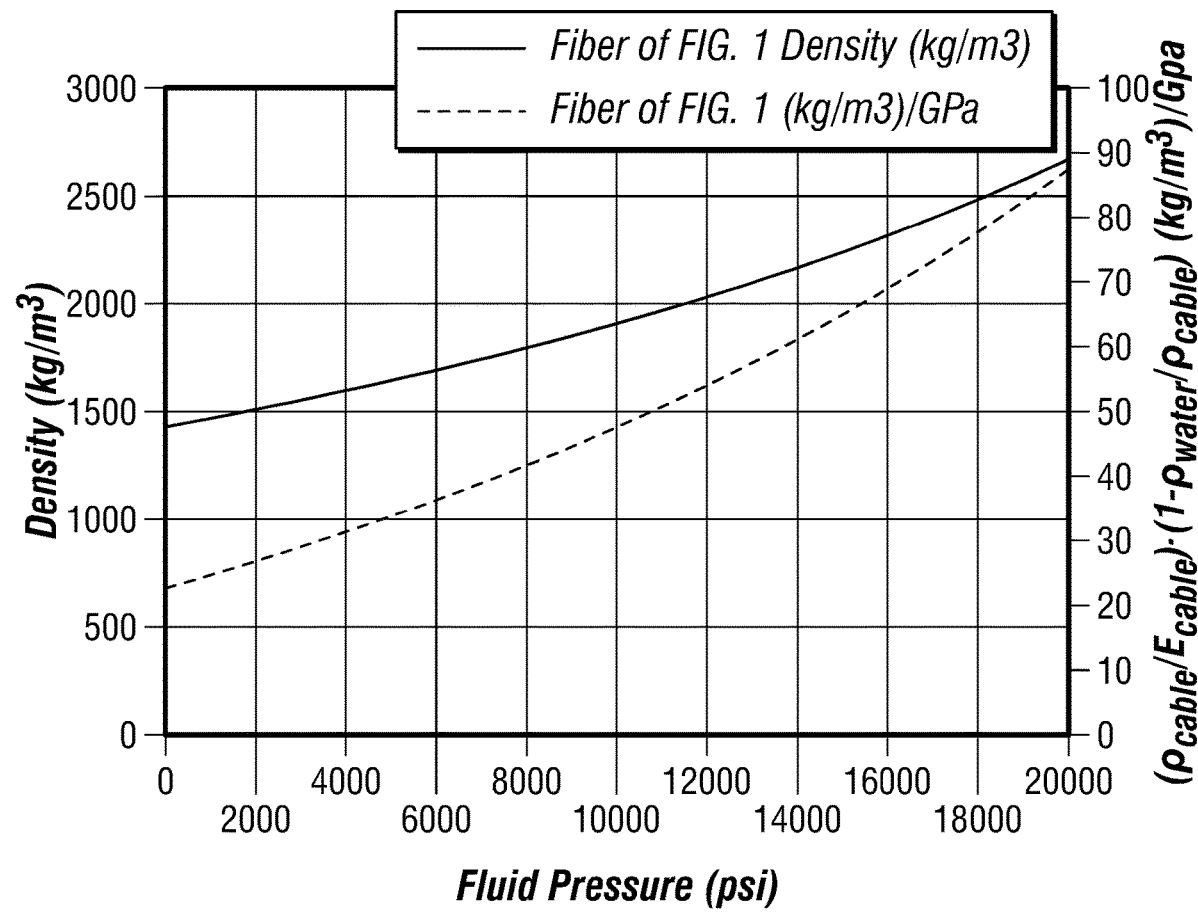
FIG. 3 is a graph showing the expected increase in density for the optical fiber of FIG. 1 and Table 1 subjected to fluid pressure.

The wellbore environment, including wellbore pressure and temperature, as well as the composition of the downhole fluids may be given proper consideration in the selection of materials for the optical fiber. Material properties such as density and stiffness will depend on the temperature and pressure downhole. Under fluid pressure, the density of the fiber increases due to the increase in pressure in a wellbore. However, over time, interaction between the wellbore fluid and the coating may result in swelling of the coating and reduce its density. Secondly, the modulus of the coating materials may not immediately change but, over time, will tend to decrease as the coating material degrades with the exposure to the wellbore fluid and higher temperature. Because disposable fibers are not intended to last a long time in the well, the long-term effects of the wellbore fluid interacting with the fiber can be neglected. Hence the value of $$\left(\frac{\rho_{\mathit{eff\,fiber}}}{E_{\mathit{eff\,fiber}}}\right) \cdot \left(1 - \frac{\rho_{\mathit{water}}}{\rho_{\mathit{eff\,fiber}}}\right),$$

and, more generally, of $$\left(\frac{\rho_{\mathit{eff\,fiber}}}{E_{\mathit{eff\,fiber}}}\right) \cdot \left(1 - \frac{\rho_{\mathit{fluid}}}{\rho_{\mathit{eff\,fiber}}}\right)$$

are modeled as being higher in the wellbore environment due to the increased fiber density. This is shown in FIG. 3 where at 20,000 psi, the density of the optical fiber of FIG. 1 and Table 1 has increased to 2670 kg/m³ and the stain coupling parameter, i.e., the product $$\left(\frac{\rho_{eff_{fiber}}}{E_{eff_{fiber}}}\right) \cdot \left(1 - \frac{\rho_{water}}{\rho_{eff_{fiber}}}\right),$$

of the optical fiber of FIG. 1 has increased to 87.6 (kg/m³)/GPa. In general, it is adequate to use the properties for room temperature and atmospheric pressure. However, for additional accuracy, property values under the downhole conditions are also appropriate for calculations.

Based on the above information, a disposable optical fiber is provided that has a higher value of the product $$\left(\frac{\rho_{eff_{fiber}}}{E_{eff_{fiber}}}\right) \cdot \left(1 - \frac{\rho_{water}}{\rho_{eff_{fiber}}}\right)$$

than currently used in the art. For example, the disposable optical fiber may have a value of the $$\left(\frac{\rho_{eff_{fiber}}}{E_{eff_{fiber}}}\right) \cdot \left(1 - \frac{\rho_{water}}{\rho_{eff_{fiber}}}\right)$$

product that is at least greater than 50 kg/m³/GPa, and optionally greater than 100 kg/m³/GPa. Any range of the value of the product above 50 or 100 kg/m³/GPa may be used but for clarity, an upper end of the range for a suitable product may be less than 1000000 kg/m³/GPa. As a result, coupling between the optical fiber and wellbore, as quantified by the maximum strain gradient achievable, can be substantially increased, as the examples provided below will demonstrate.

In a first embodiment, the higher value for the $$\left(\frac{\rho_{eff_{fiber}}}{E_{eff_{fiber}}}\right) \cdot \left(1 - \frac{\rho_{water}}{\rho_{eff_{fiber}}}\right)$$

product is achieved by adding an additional layer of high-density material in the optical fiber without the use of fillers. The additional layer material may be any suitable material having the specified characteristics. For example, the additional layer may comprise a polymer. High-density may be considered to be a density above 1000 kg/m³. Any range of densities above 1000 kg/m³ may be used but for clarity, an upper end of the range for a suitable density may be 30000 kg/m³. The dominant term in the $$\left(\frac{\rho_{eff_{fiber}}}{E_{eff_{fiber}}}\right) \cdot \left(1 - \frac{\rho_{water}}{\rho_{eff_{fiber}}}\right)$$

product will usually be $$\frac{\rho_{eff_{fiber}}}{E_{eff_{fiber}}}$$

and since both the contribution of a new layer to the effective density of the optical fiber, and to the effective stiffness of the fiber are proportional to the cross-sectional area of the layer, it is usually sufficient that the density over stiffness ratio of the additional layer material be higher than the effective density over effective stiffness ratio of the underlying fiber for the final $$\frac{\rho_{eff_{fiber}}}{E_{eff_{fiber}}}$$

ratio, applicable to the whole optical fiber, to also increase, and therefore also the $$\left(\frac{\rho_{eff_{fiber}}}{E_{eff_{fiber}}}\right) \cdot \left(1 - \frac{\rho_{water}}{\rho_{eff_{fiber}}}\right)$$

product.

HYTREL® and PFA are two materials that have relatively high ρ/E ratio (see Table 2). Examples of their use are listed in Table 3.

TABLE 2

| Material | Density ρ (kg/m³) | Axial Young's Modulus E (GPa) | $\left(\frac{\rho}{E}\right) \cdot \left(1 - \frac{\rho_{water}}{\rho}\right)$ |
| --- | --- | --- | --- |
| Silicone | 1000 | 0.0003 | 0 |
| PFA | 2150 | 0.550 | 2091 |
| HYTREL ® | 1260 | 0.550 | 473 |
| HYTREL ® + Iron ($V_f$ = 0.4062) | 3947 | 0.924 | 3189 |
| HYTREL ® + BaSO₄ ($V_f$ = 0.295) | 2142 | 0.776 | 1472 |
| HYTREL ® + Talc ($V_f$ = 0.064) | 1351 | 0.587 | 598 |

In a second embodiment category, the higher value of the $$\left(\frac{\rho_{eff_{fiber}}}{E_{eff_{fiber}}}\right) \cdot \left(1 - \frac{\rho_{water}}{\rho_{eff_{fiber}}}\right)$$

product is achieved by adding an additional layer of material over the waveguide but wherein the new layer is a material that includes a matrix modified with the addition of a filler such that the new layer is high-density, i.e., a density above 1000 kg/m³, through the combination of the additive density of the matrix and the density of the filler. For example, the density of the filler may itself be above 1000 kg/m³ and then the density of the matrix need not be as high. Again, the additional layer material may be any suitable material having the specified characteristics. For example, the additional layer may comprise a polymer. Any range of densities above 1000 kg/m³ may be used but for clarity, an upper end of the range for a suitable density may be 30000 kg/m³.

When considering the use of a filler, it is important to know that the filler may also increase the stiffness of the combined material. The density $\rho_c$ of a material with particulate filler of density $\rho_f$ added as a volume fraction $V_f$ to a host matrix of density $\rho_m$ is obtained as:

$$\rho_c = (1-V_f)\rho_m + V_f\rho_f \qquad \text{Eq. (5)}$$

The Young's modulus of the composite $E_c$ can be estimated from the modulus of the matrix material $E_m$, that of the filler $E_f$ and the filler volume fraction $V_f$ as follows:

$$\frac{1}{E_c} = \frac{(1-V_f)}{E_m} + \frac{V_f}{E_f} \quad \text{Eq. (6)}$$

Which can also be written:

$$E_c = \frac{E_f E_m}{(1-V_f)E_f + V_f E_m} \quad \text{Eq. (7)}$$

The ratio $\rho_c/E_c$ is thus:

$$\frac{\rho_c}{E_c} = \frac{((1-V_f)E_f + V_f E_m)((1-V_f)\rho_m + V_f \rho_f)}{E_f E_m} \quad \text{Eq. (8)}$$

The maximum ratio is obtained for $V_f = V_{f_{opt}}$ $$V_{f_{opt}} = \frac{E_f(\rho_f - 2\rho_m) + E_m \rho_m}{2(E_f - E_m)(\rho_f - \rho_m)} \quad \text{Eq. (9)}$$

In which case the optimum ratio is obtained as:

$$\frac{\rho_c}{E_c}\bigg|_{opt} = \frac{(E_f \rho_f - E_m \rho_m)^2}{4 E_f E_m (E_f - E_m)(\rho_f - \rho_m)} \quad \text{Eq. (10)}$$

Figure 4:
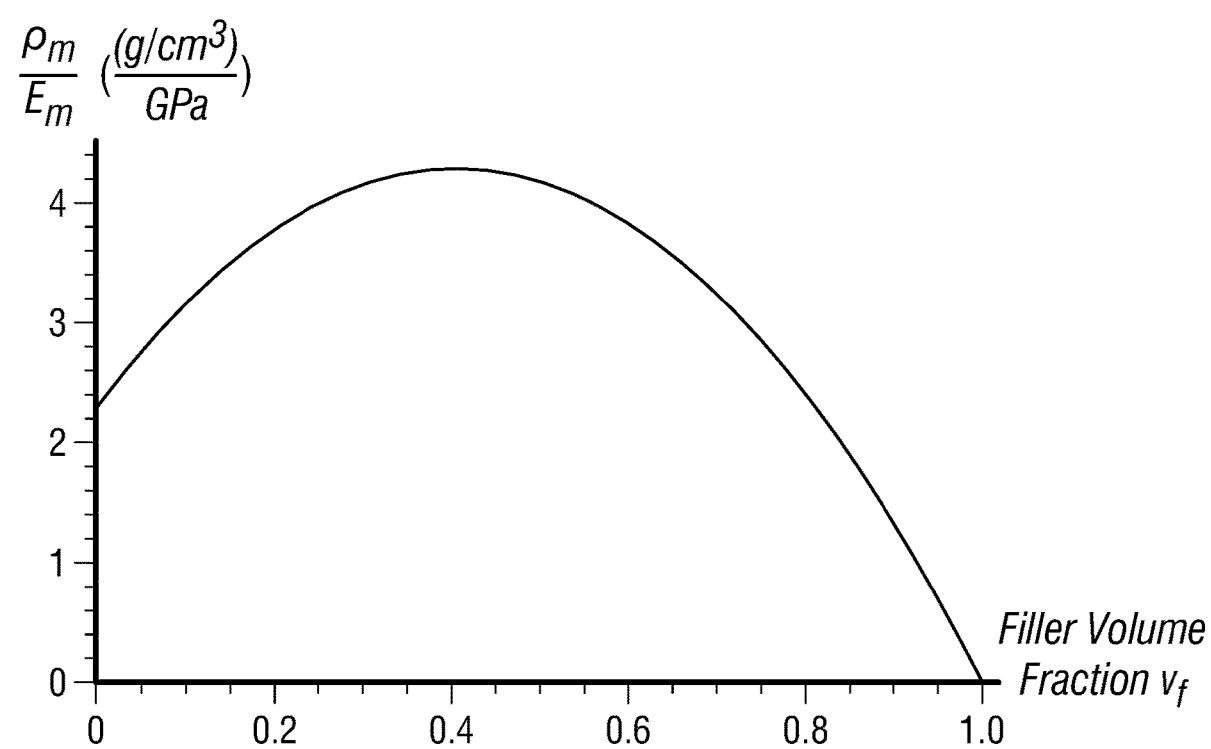
FIG. 4 is a design curve for a coating material to optimize its density over stiffness ratio, in accordance with one or more embodiments.

The use of Eqs. (6) through (10) is illustrated in FIG. 4 for the case of iron powder filler ($\rho_f$=7874 kg/m³) in a HYTREL® matrix ($\rho_m$=1260 kg/m³). The optimal volume fraction, in this case, $V_{f_{opt}}$=40.62%, resulting in $$\frac{\rho_c}{E_c}\bigg|_{opt} = 4269 \text{ kg/m}^3/\text{GPa}.$$

Table 3 lists the strain coupling parameters, $$\left(\frac{\rho_{eff_{fiber}}}{E_{eff_{fiber}}}\right) \cdot \left(1 - \frac{\rho_{water}}{\rho_{eff_{fiber}}}\right),$$

for different optical fibers of this category.

Candidate filler materials include metal powders, an example of which is iron powder, or mineral powders such as barium sulfate, zinc oxide, or talc. Whereas spherical particulates are generally considered here, other shapes such as platelets, ellipsoids, and whiskers can be used as well.

For greater optimization, if the outer diameter is pre-selected, the choice of filler volume fraction can be done with the purpose of optimizing the product $$\left(\frac{\rho_{eff_{fiber}}}{E_{eff_{fiber}}}\right) \cdot \left(1 - \frac{\rho_{water}}{\rho_{eff_{fiber}}}\right)$$

directly.

For even greater optimization, if the outer diameter is pre-selected, and the wellbore fluid density known, the choice of filler volume fraction can be done with the purpose of optimizing the product $$\left(\frac{\rho_{eff_{fiber}}}{E_{eff_{fiber}}}\right) \cdot \left(1 - \frac{\rho_{fluid}}{\rho_{eff_{fiber}}}\right)$$

directly.

As a third embodiment, the optical fiber can be constructed with layers so as to directly increase the effective $\rho/E$ ratio for the whole optical fiber. For example, a 125 µm waveguide can be coated with a silicone, 290 µm diameter, followed by an iron-filler optimized HYTREL® 500 µm in diameter to get an effective optical fiber density of 3030 kg/m³, a $\rho_{eff}/E_{eff}$ of 607 kg/m³/GPa, for a $$\left(\frac{\rho_{eff_{fiber}}}{E_{eff_{fiber}}}\right) \cdot \left(1 - \frac{\rho_{water}}{\rho_{eff_{fiber}}}\right)$$

product of 407 kg/m³/GPa and $$\left|\frac{d\varepsilon}{dz}\right|_{max} = 1198 \text{ µ}\varepsilon/\text{km}$$

(using µ=0.3 and $\rho_{fluid}=\rho_{water}$=1000 kg/m³).

Using Equation 1, the maximum strain gradient that can be achieved for example fibers by Coulomb friction interaction between the flexible disposable fiber and a horizontal wellbore wall is shown below in Table 3. In those calculations, for the maximum strain gradient, the fluid inside the wellbore is assumed to be water ($\rho_{fluid}$=1000 km/m³) and the value of the coefficient of friction µ=0.3 is used.

TABLE 3

| Fiber Type | Category | $D_c$ (µm) | $\rho_{eff}$ (kg/m³) | $E_{eff}$ (GPa) | $\frac{\rho_{eff_{fiber}}}{E_{eff_{fiber}}} \times \left(1 - \frac{\rho_{water}}{\rho_{eff_{fiber}}}\right)$ (kg/m³)/GPa | $\left|\frac{d\varepsilon}{dz}\right|_{max}$ µε/km |
|---|---|---|---|---|---|---|
| Standard fiber, 242 µm diameter acrylate, over 125 µm cladding | Prior Art | 242 | 1429 | 19.025 | 22.55 | 66 |
| Smaller diameter fiber, 165 µm diameter acrylate, over 80 µm cladding | No improvement from prior art. | 165 | 1396 | 16.67 | 23.75 | 70 |

TABLE 3-continued

| Fiber Type | Category | $D_c$ (μm) | $\rho_{eff}$ (kg/m³) | $E_{eff}$ (GPa) | $\dfrac{\rho_{eff\,fiber}}{E_{eff\,fiber}} \times \left(1 - \dfrac{\rho_{water}}{\rho_{eff\,fiber}}\right)$ (kg/m³)/GPa | $\left\|\dfrac{d\varepsilon}{dz}\right\|_{max}$ με/km |
|---|---|---|---|---|---|---|
| Simple HYTREL ®, coating, 500 pm diameter, over standard 242 μm acrylate, 125 μm cladding optical fiber | Embodiment 1 | 500 | 1300 | 4.88 | 61.4 | 181 |
| Simple HYTREL ®, coating, 900 μm diameter, over standard 242 μm acrylate, 125 μm cladding optical fiber | Embodiment 1 | 900 | 1272 | 1.886 | 144 | 425 |
| HYTREL ® + Iron filler coating, 500 μm diameter, over standard 242 μm acrylate, 125 μm cladding optical fiber | Embodiment 2 | 500 | 3357 | 5.16 | 456 | 1343 |
| HYTREL ® + Iron filler coating, 900 μm diameter, over standard 242 μm acrylate, 125 μm cladding optical fiber | Embodiment 2 | 900 | 3765 | 2.23 | 1238 | 3643 |
| HYTREL ® + BaSO$_4$ filler coating 500 μm diameter, over standard 242 μm acrylate, 125 μm cladding optical fiber | Embodiment 2 | 500 | 1975 | 5.05 | 193 | 568 |
| HYTREL ® + BaSO$_4$ filler coating, 900 μm diameter, over standard 242 μm acrylate, 125 μm cladding optical fiber | Embodiment 2 | 900 | 2090 | 2.10 | 520 | 1531 |
| HYTREL ® + Talc filler coating 500 μm diameter, over standard 242 μm acrylate, 125 μm cladding optical fiber | Embodiment 2 | 500 | 1370 | 4.91 | 75.32 | 222 |
| HYTREL ® + Talc filler coating, 900 μm diameter, over standard 242 μm acrylate, 125 μm cladding optical fiber | Embodiment 2 | 900 | 1357 | 1.92 | 186 | 547 |

TABLE 3-continued

| Fiber Type | Category | $D_c$ (μm) | $\rho_{eff}$ (kg/m$^3$) | $E_{eff}$ (GPa) | $\frac{\rho_{eff fiber}}{E_{eff fiber}} \times \left(1 - \frac{\rho_{water}}{\rho_{eff fiber}}\right)$ (kg/m$^3$)/GPa | $\left\|\frac{d\varepsilon}{dz}\right\|_{max}$ με/km |
|---|---|---|---|---|---|---|
| PF A coating (400 um dia) over silicone (290 um dia) over 125 μm cladding optical fiber | Embodiment 3 | 400 | 1662 | 7.10 | 93.3 | 275 |
| HYTREL® + Iron filler coating, 500 μm diameter, over silicone (290 um dia) over 125 μm cladding optical fiber | Embodiment 3 | 500 | 3030 | 4.99 | 407 | 1198 |

As can be seen from Table 3, selecting materials with a higher density and higher ρ/E helps in making the product $$\left(\frac{\rho_{eff fiber}}{E_{eff fiber}}\right) \cdot \left(1 - \frac{\rho_{water}}{\rho_{eff fiber}}\right)$$

larger, leading to the desired outcome of higher maximum strain gradient $$\left|\frac{d\varepsilon}{dz}\right|_{max} \cdot A\left(\frac{\rho_{eff fiber}}{E_{eff fiber}}\right) \cdot \left(1 - \frac{\rho_{water}}{\rho_{eff fiber}}\right)$$

product with a value equal or greater than 50 kg/m$^3$/GPa is desired, and a value equal or greater than 100 kg/m$^3$/GPa, which is more than twice the value for an optical fiber without such outer layer and filler under ambient conditions, and higher than the value at 20 ksi downhole pressure, will provide a substantial improvement in increasing the maximum strain gradient of the optical fiber. In fact, improvements up to 55 times that of a standard optical fiber are listed in Table 3.

Another observation from Equations 1 and 4 is that a way to increase the maximum strain gradient achievable is to increase the coefficient of friction. However, this cannot be done easily. Potentially, one option is to increase the roughness of the outside of the fiber by physical manipulation.

Figure 5:
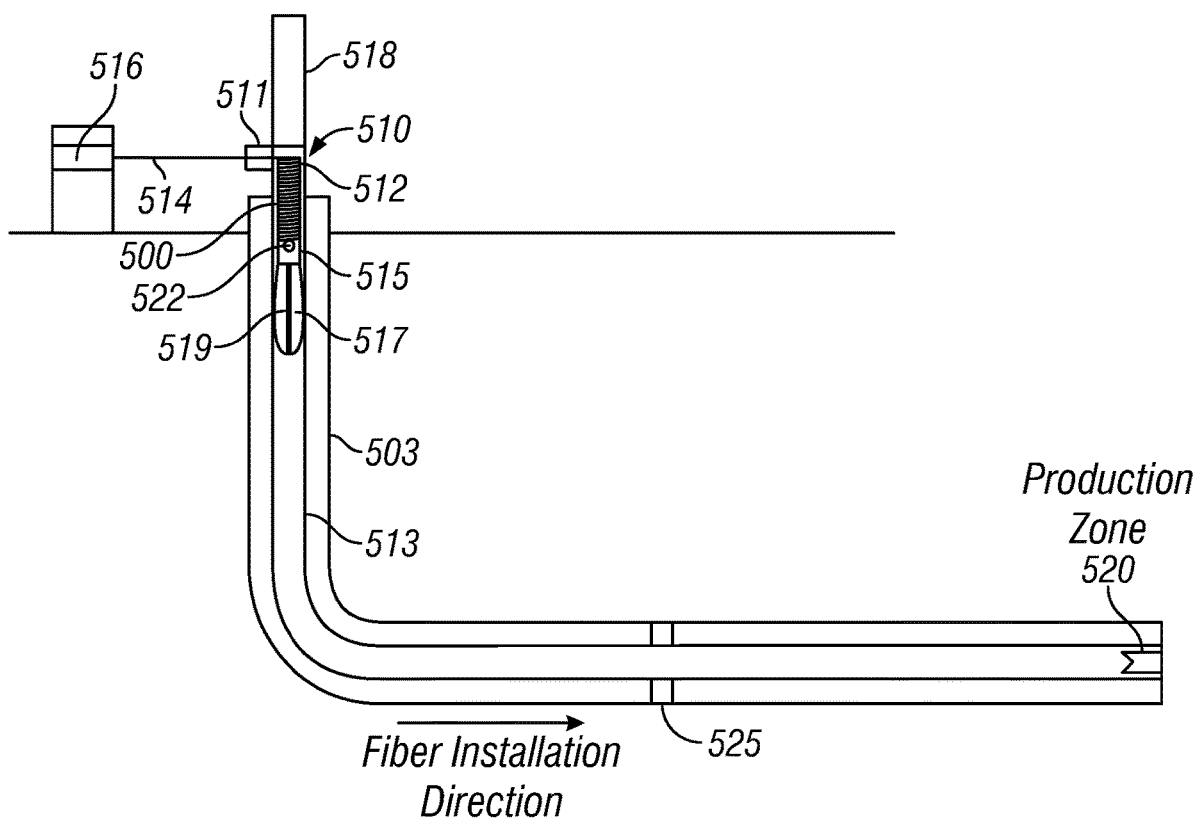
FIG. 5 is a schematic representation of an example of pump down spooler insertion, in accordance with one or more embodiments.

FIG. 5 is a schematic representation of an embodiment of a system and method for deploying an optical fiber in a wellbore. As shown in FIG. 5, the system uses an example pump down spooler insertion for deploying the optical fiber 500. The optical fiber 500 can be installed in the well 503 using pump down installation in a from-top-to-bottom installation process in a production string 513. The well 503 in the embodiment shown in FIG. 5 may be a cased hole. Such a method can be employed without the use of e.g. coiled tubing equipment for deployment. It should also be appreciated that the systems and methods shown can be used within a wellbore that is cased or uncased and not completed with a production string.

In various embodiments, a spooler mechanism 510 designed to be pumped down from the surface and to lay the optical fiber 500 as it goes, from top to bottom, can be used to deploy the optical fiber 500. The fiber spooler mechanism 510 may include a coil of fiber where the optical fiber is released as the fiber spooler mechanism is pumped down the wellbore. The fiber spooler mechanism 510 may be a simple coil of fiber attached to a float 517 where the float may be a made out of various density materials to allow, e.g., gravity deployment in a vertical or deviated section, or controlled pumped deployment. The float 517 or the fiber spooler mechanism 510 may house swab cups or other similar features along the fiber spooler mechanism 510 to support pumping operations, and the float density may be adjusted with respect to the wellbore fluid density. The optical fiber 500 may be wrapped around a support member or the optical fiber 500 may be wound in a coil where the coil may be protected by a suitable housing. Other implementations may include combinations where the fiber spooler 510 can include a mud motor 515, a fiber spool 512 containing the optical fiber 500 to be laid, and a neutral buoyancy float 517 may also be used. The neutral buoyancy float 517 can be made of syntactic foam with a density calculated to provide neutral buoyancy of the fiber spooler mechanism 510. Thus, it should neither float nor sink in pumping fluid used to pump the fiber spooler 510 towards the end of the well. This would allow a controlled friction between the fiber spooler 510 and the wellbore due to gravity. When the pump down fluid is stationary, so too is the fiber spooler mechanism 510. This ensures that no additional strain is applied by gravity to the optical fiber 500 as it is unspooled. The optional mud motor 515 can be powered by the pumping fluid. To enable the fluid to pass through the mud motor 515, a conduit through the fiber spool 512 and the neutral buoyancy float 517 allows some of the fluid to exit to the fluid volume below the spooler mechanism 510. For example, 10% to 50% of the fluid flow may pass through the mud motor 515, while the rest of the flow moves the mechanism downhole. Other fluid ratios may be used if a mud motor 515 is present.

The fiber spooler 510 can be first mounted in a spooler launcher 518. Fluid connections, valves and pressure control equipment are not shown on the spooler launcher 518. The optical fiber 500 can be anchored at the surface by mounting an end of the optical fiber 500 to a well head exit 511 where the well head exit or fiber connection may be part of the spooler launcher 510. When pumping begins, the fiber spooler 510 starts to move downhole while at the same time the mud motor 515 rotates the fiber spooler 510. This action causes the optical fiber 500 to be unwound in a spiral fashion against the inner wall of the pipe of the production string 513. See FIG. 6. With the fiber spooler 510, the relationship between rotational velocity and linear deployment velocity can be fixed by amount of flow through the mud motor 515, which is fixed in relationship to the total flow so that only a uniform spiral can be created. It cannot create variable pitch of the spiral, for example, a more concentrated pitch through areas of interest. It may also be possible to deploy the optical fiber 500 with minimum rotation and/or without the mud motor so that the optical fiber length deployed in the well is equal to or near equal to the well depth.

The fiber spooler 510 continues to unwind the optical fiber 500 until it reaches the bottom of the hole, where an optional catcher 520 locks on to the end of the fiber spooler 510 to prevent further movement, and locks the mud motor 515 to prevent further rotation. Catcher 520 may or may not be present, and pumping may be stopped before the fiber spooler 510 has reached the end of the well. It is noted that once pumping commences, this process technique can be completely automatic. Fiber data may be measured using a distributed fiber optic sensing system where e.g. a Distributed Acoustic Sensing (DAS) or a Distributed Strain Sensing (DSS) system may be used to detect how much fiber has been deployed in the wellbore and how much fiber remains on the fiber coil on the fiber spooler 510. Fiber deployed in the wellbore will be exposed to fluid flow and the fiber will move in the fluid flow and generate signals measurable with a DAS or DSS system whereas the fiber remaining on the fiber coil will have less movement enabling identification of the boundary between the fiber deployed in the wellbore and the fiber remaining on the optical fiber 500 on fiber spooler 510. Strain and/or acoustic signal amplitude and/or frequency may be measured along the fiber and the data or computed values can then be compared either in absolute or relative values and/or ratio-metric calculations. The transition between the length of fiber in the wellbore and the remaining length on the fiber coil can then be identified. A measured length of the deployed fiber would then enable automatic control of the fiber pumping operation, and the operation may be allowed to continue until a desired fiber deployment depth along the wellbore has been reached. Similarly, it may be desirable to control the pump rate to control the rate of deployment of the optical fiber 500 as the optical fiber may break if deployed at a high pump rate given that fiber tension is highly dependent on the deployment rate. The control system may control pump operations to keep a measured fiber strain below a certain threshold while the fiber spooler 510 is deployed in the wellbore. After the optical fiber 500 is laid with the arrival of the fiber spooler 510 at the end of the well 503, the fiber spooler 510 may not be retrieved. The fiber spooler 510 may also contain a fiber optic pressure transducer at a well head exit 511, which measures pressure at the toe of the well 503. The core of the optical fiber 500 or one of the cores of the optical fiber 500, if the optical fiber 500 is a multi-core optical fiber, can be used to communicate information to the surface with respect to the pressure readings generated by the fiber optic pressure gauge 522. The optical fiber 500 may be realized by the optical fiber 200 of FIG. 2, or other optical fiber structure.

Figure 6:
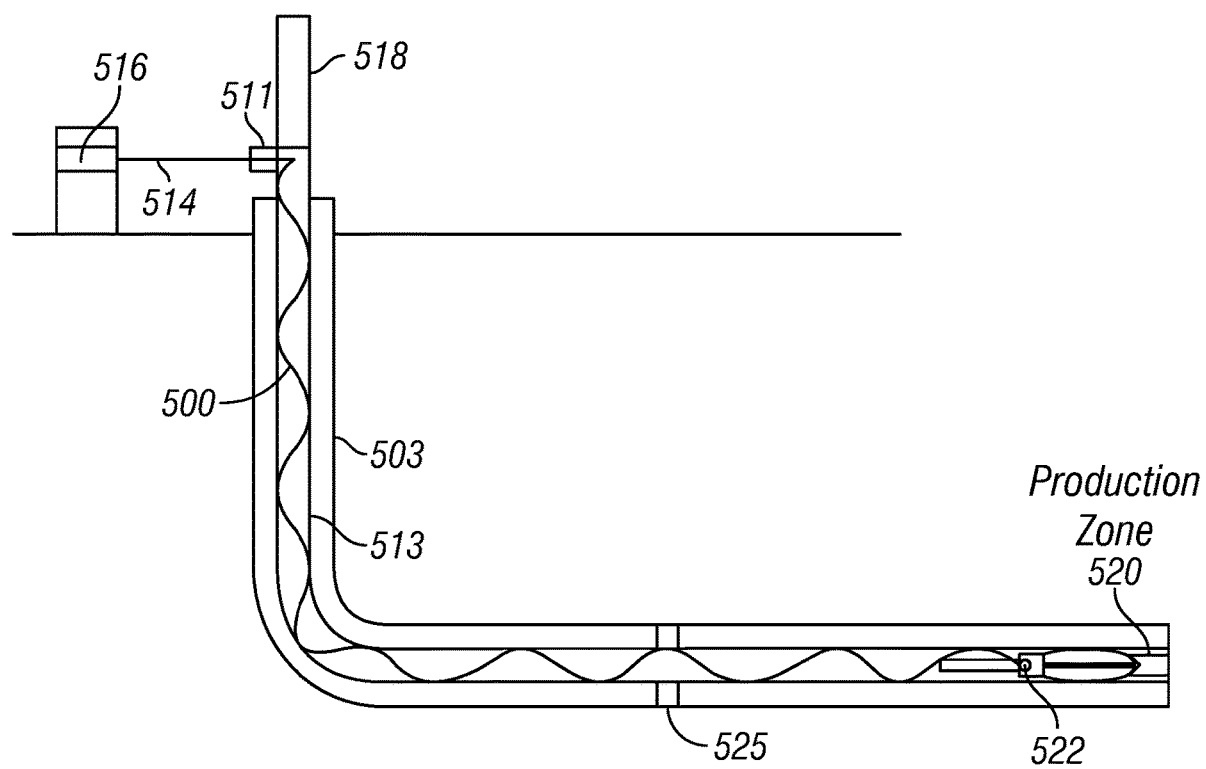
FIG. 6 is a schematic representation of the optical fiber deployed by the pump down spooler fiber deployment of FIG. 4, in accordance with one or more embodiments.
Figure 7:
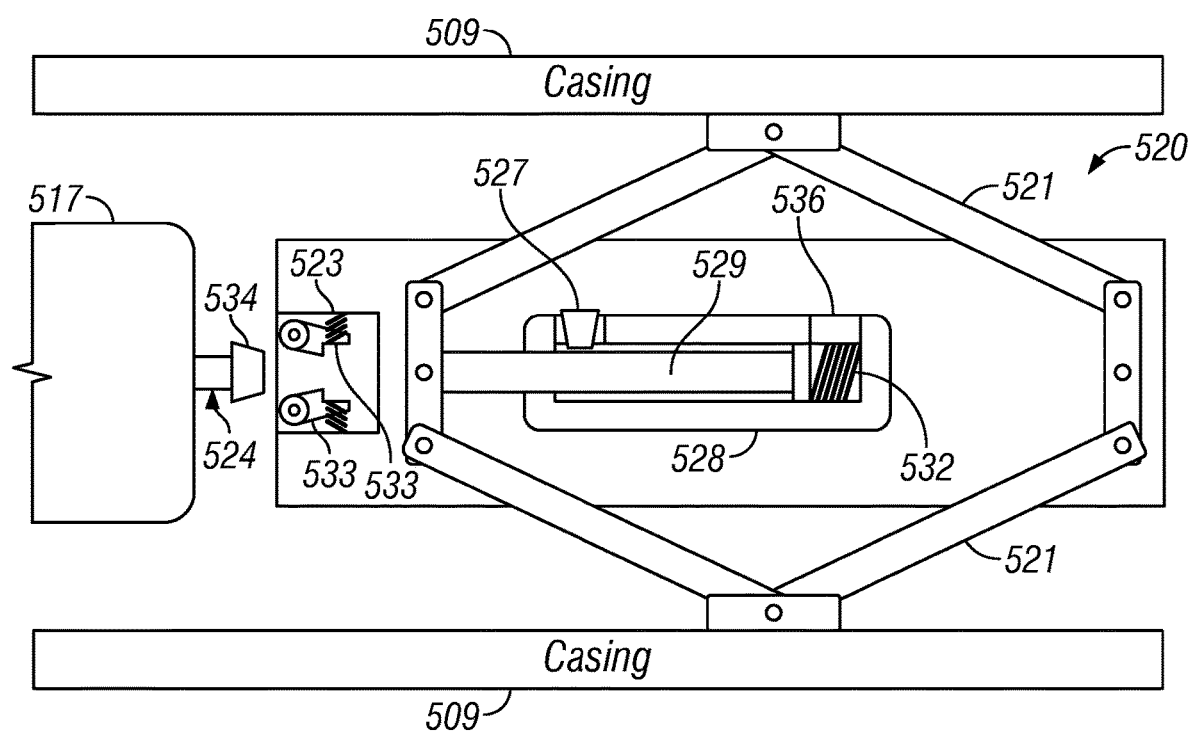
FIG. 7 is a schematic representation of an example catcher that may be used as a bottom hole catcher mechanism, in accordance with one or more embodiments.

FIG. 7 is a schematic representation of an embodiment of example features of catcher 520 that may be used as a bottom hole catcher mechanism as shown in FIGS. 5 and 6. Other catcher devices may also be used. The catcher 520 can include pressure activated locking arms 521 for gripping a casing wall 509 and a latch mechanism 523 for retaining a fiber deployment mechanism 524 that includes the float 517 and a stabber 534 attached to the float 517. The catcher can be deployed with the casing, can be deployed with coil, or can be pumped down and then pressure activated.

FIG. 7 shows a pumped down version that has been activated by rupturing a low pressure burst disk 527 using pressure (shown as ruptured in FIG. 7). This allows pressure into a cylinder 528, which causes a piston 529 to move and expand the gripper arms 521 against the inner diameter of the casing wall 509, which may be a collar. A return spring 532 is compressed by the pressure force on the piston 529.

When the fiber deployment mechanism 524 reaches the catcher 520, spring latches 533 of the catcher 520 are forced open by a stabber 534 of the fiber deployment mechanism 524. The stabber can be attached to the float 517 of FIG. 5 as part of the fiber deployment mechanism 524. Then, the spring latches 533 retract to hold the fiber deployment mechanism 524 in place.

The fiber deployment mechanism 524 and the catcher 520 can be retrieved together by rupturing a high pressure rupture disk 536. The high pressure rupture disk 536 is high pressure in that it is ruptured at a pressure higher than the pressure that the pressure burst disk 527 is ruptured. This equalizes the pressure on both sides of the piston 529 and the spring 532 expands, causing the locking arms 521 to retract, freeing the assembly for retrieval.

As shown in FIG. 5, the optical fiber 500 can be spliced or coupled to a surface optical fiber 514 connected to surface instrumentation 516, which can include a data acquisition unit comprising a processor. The connection of the end of the optical fiber 500 and to the surface optical cable fiber 514 may be conducted prior to moving the fiber spooler 510 down the production string 513 or at some time later in the procedure such as after capture of the fiber spooler by the catcher 520.

FIG. 6 is a schematic representation of the optical fiber 500 deployed by the pump down spooler fiber deployment of FIG. 5. The optical fiber 500 is coupled to the fiber spooler 510 that has been captured by the catcher 520 and runs in a spiral or straight in the production string 513 in the well 503 to the well head exit 511 at the surface. The surface optical cable fiber 514 couples the optical fiber 500 from the well head exit 511 to surface instrumentation 516 that may also include an optical fiber interrogator. The interrogator can include an optical source that generates an optical signal in the optical fiber 500 to the end of the optical fiber 500 at the captured fiber spooler 510, a receiver to receive an optical signal or signals in response to the interrogation signal from the optical source, and processing equipment to process the received optical signal(s). The received optical signal(s) can include data from the pressure gauge 522 and/or data from the optical fiber 500 itself being an optical fiber sensor and/or optical sensors deployed with respect to the optical fiber 500. The processing equipment of the interrogator of the surface instrumentation 516 can include one or more interferometric systems. The processing can be performed using one or more techniques as previously discussed or using other techniques of processing data from sensors associated with one or more optical fibers.

Methods in accordance with the teachings herein associated with FIGS. 5-7 are repeatable. If the optical fiber, laid or being laid in these methods, breaks or signal quality deteriorates, the optical fiber can be retrieved, or the optical fiber can be broken up by a suitable tool and pumped out. The coiled tubing method, the pump down method, or similar methods can be repeated to install new optical fiber.

With the optical fiber deployed, the weight of the fiber couples the fiber with the wall of the wellbore so that the fiber can detect the strain the formation surrounding the wellbore is undergoing. The ability to detect wellbore strain in this manner may be used in numerous wellbore applications. For example, oil and gas production using fracturing (or fracing) may be improved by measuring subsurface conditions and analyzing these measurements. Fracturing subsurface formations enables oil and gas production from the formation that might otherwise be trapped or difficult to extract. Fracturing may include drilling a borehole into a formation, lining the borehole with casing, and cementing the casing in place. In some cases, the final borehole may be drilled perpendicular to the surface, while in other cases, the borehole may include portions that are perpendicular to the surface, a portion that is curved, and another portion that is parallel to the surface. In certain implementations, the casing may be perforated using perforation charges or shaped charges. A fluid, including, for example, water, may be injected into the formation through the perforations at high pressure to create fractures that enable the oil and gas within the formation to flow back to the casing, where the oil and gas may be extracted from the formation. In certain implementations, the fluid used to create the subsurface fractures may include particulates called proppant to keep the fractures open to enable the oil and gas production process.

Figure 8:
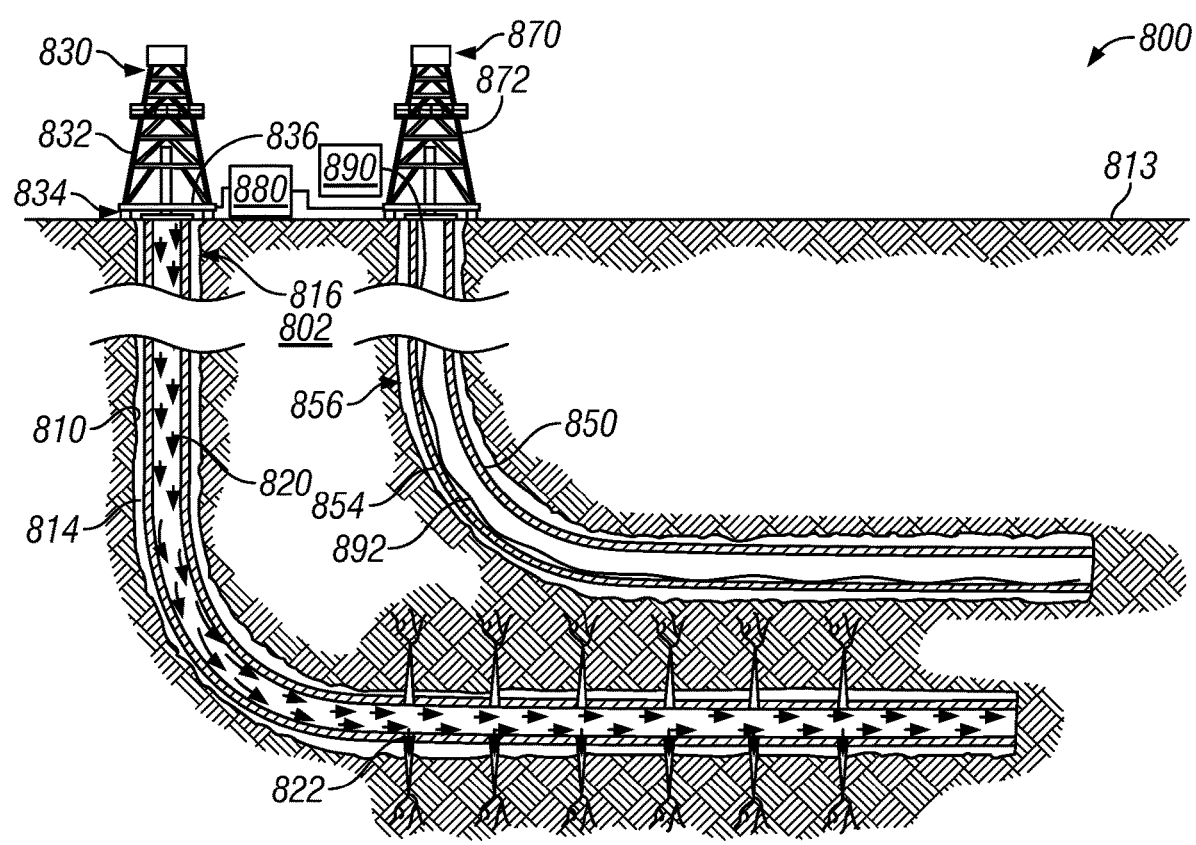
FIG. 8 is a schematic representation of a well being hydraulically fractured while being monitored by an optical fiber in a nearby observation well, in accordance with one or more embodiments.

Various aspects of the present disclosure may be implemented in various other environments as well. As another example, FIG. 8 is a cross-sectional schematic diagram depicting an example wellbore environment 800 comprising a treatment well and a monitoring well that permits the acquisition of subsurface data and enables analysis of one or more subsurface properties according to one or more aspects of the present disclosure. The wellbore environment 800 may comprise a first well 830, which may be a treatment well, and a second well 870 which may be a monitoring well. The first well 830 may comprise a first wellbore 810, and the second well 870, may comprise a second wellbore 850. The first well 830 may further comprise a drilling platform 832, a wellhead installation 834, and blowout preventers 836 at a surface 813. The second well 870 may comprise a second drilling platform 872, a wellhead installation (not labeled), and blow out preventers (not labeled) at the surface 813. In one or more embodiments, the drilling platforms 832, 872 may support components for one or more of drilling, exploration, and sensing, including, for example, drill strings and one or more liners or casing 814, 854 that are cemented in place using cement 816, 856.

Production data including, for example, pressures, flow rates, fluid rates, proppant rates, proppant sizes, diversion rates, diversion volumes, diverter sizes, chemical types, chemical rates, and chemical volumes, may be captured using a data acquisition unit 890, which may be a computing device or information handling system. Captured data may be used for simulation, modeling calibration, fracture network modeling, to guide drilling operations and production management, or any combination thereof. A control system 880 may be coupled to one or more of the equipment for the first well 830 and the second well 870, and may use data captured by the data acquisition unit 890 to improve control of one or more of the drilling, exploration, and sensing activities. While FIG. 8 illustrates an onshore subsurface environment at a surface 813, the present disclosure additionally contemplates an offshore environment (not shown).

FIG. 8 also includes an exemplary fiber optic sensing system comprising an optical fiber 892 disposably installed within the casing 854 of a monitoring well 870 in the manner described above, in accordance with one or more embodiments of the present disclosure. The monitoring well 870 may run generally parallel to a nearby treatment well 830 that is being fractured, as shown by the fluid 820 flowing into the first well 830 and then the fluid 822 entering fractures in FIG. 8. In one or more embodiments, the optical fiber may comprise one or more sensors distributed along a wellbore, including the horizontal section of the wellbore, such that the pressure sensors are distributed spatially along the length of the casing and the sensors will respond to formation pressure as a result of their being outside the casing. The pressure sensors may measure data from multiple locations at measurements speeds ranging from millihertz (mHz) to kilohertz (kHz). For example, the optical fiber may be based on slim-line pressure sensors, temperature, acoustic, and/or strain sensing fibers or multiple sensing technologies multiplexed in one fiber or multiple fibers, as discussed herein. Other types of sensors may include surface and down-hole pressure sensors.

Without limitations, the optical fiber 892 may use dynamic strain measurements or static strain measurements to determine fractures and subsurface effects during a hydraulic fracturing operation including fracture behavior and fracture volume by observing deviations in strain measurements from a measured baseline before fracturing a stage, wherein a stage is an independent fracturing treatment. Static strain measurements may also be used to determine formation properties like permeability, poroelastic responses of the subterranean formation 802, leak-off rates based on the change of strain over time and the rate at which the strain changes over time, and combinations thereof. Dynamic strain measurements may be used in real-time to detect fracture growth and the data may be processed through an inversion model. Computer vision or other means of processing the data may be used to identify strain patterns in the measured data where pattern recognition may be used to identify number of fracture, fractures opening and closing, fracture orientation, fracture growth rates and fracture complexity. In one or more embodiments, actions to mitigate detrimental effects based on the dynamic strain measurements include, but are not limited to, dynamic changes to fluid flow rates in the treatment well (for example, the second well 830), treatment pressures, the addition of diverters or chemicals into the treatment fluid 822, changes to proppant concentrations, changes to types of proppants used, and combinations thereof. In one or more embodiments, the optical fiber 892 may be configured to measure pressure changes due to poroelastic responses of the subterranean formation 802, to measure changes in fracture growth rate due to changes in strain measurements, micro-seismic events and combinations thereof.

Figure 9:
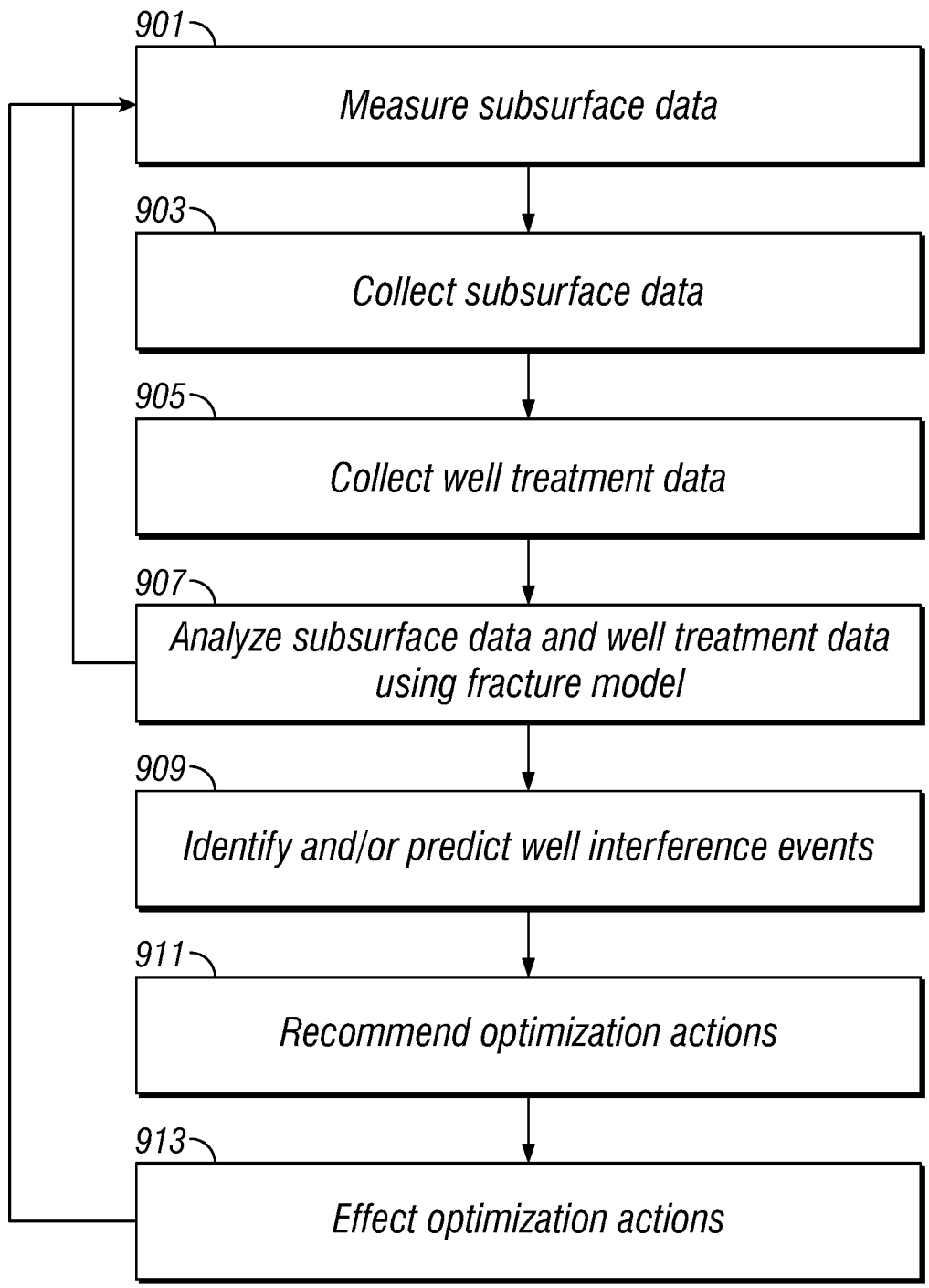
FIG. 9 is a flow diagram of features of an example method of installing an optical fiber into a well at a well site, in accordance with one or more embodiments.

FIG. 9 is a flow diagram illustrating one embodiment of a process for suggesting fracturing treatment optimization actions based, at least in part, on a fracture network model incorporating subsurface sensor data and well treatment data. In step 901, one or more sensors may measure subsurface data, including, for example, subsurface pressure, temperature acoustic and/or strain data. As disclosed herein, the one or more sensors may comprise an optical fiber in accordance with this disclosure.

In step 903, the optical fiber and sensors may collect the subsurface data from the one or more subsurface sensors. In one or more embodiments, the optical fiber may include a single-mode fiber (SMF) that is interrogated by a distributed acoustic sensing (DAS) system. Distributed sensing systems operating based on Rayleigh, Raman or Brillouin scattering principles may be used where the systems may operate in Optical Time Domain Reflectometry (OTDR), Optical Frequency Domain Reflectometry (OFDR), interferometric, amplitude, frequency, phase based sensing principles or any other sensing principles known to a person skilled in the art. Collected DAS data may be processed for microseismic data and low frequency filtered data (dynamic strain) for use in microdeformation monitoring. The single-mode fiber may include Fiber Bragg Gratings (FBGs) used to detect one or more of subsurface pressures, temperatures, and strain. The optical fiber may be interrogated using other systems, including, for example, DSS and DTS systems. In one or more embodiments, a single fiber may be interrogated using multiple systems. For example, a splitter may be used in time-division multiplexing systems or an optical switch may be used with different equipment to interrogate the optical fiber. In one or more embodiments, the system may comprise one or more surface pressure sensors. The subsurface pressure sensors may be coupled to the optical fiber to collect subsurface data from the optical fiber at speeds ranging from mHz to kHz.

In step 905, one or more sensors and systems, for example, the data acquisition unit 890 of FIG. 8 may be coupled to an optical fiber 892 and may collect data corresponding to the treatment of a treatment well 830 or a monitoring well 870. Treatment parameters used in the fracture network model may be collected from numerous sources such as historical and regional data including, for example, permeability, porosity, in situ stresses, and the existence of natural fractures in the area; planned fracture treatment schedules; actual treatment data including, for example, surface rates, pressures, concentrations, chemicals, proppants, and volumes, which may be obtained in real time from the on-site fracturing data acquisition unit 890 and control system 880; wellbore geometry and trajectory; logs of various types; actual and predicted data collected from previous wells and well stages; and poroelastic pore pressure, microseismic, temperature, and strain data.

In one or more embodiments, the system may comprise a fracture network model. A fracture model may comprise a set of equations expressed as a mathematical model implemented in software that corresponds to the subsurface physics. This fracture model may be applied to data corresponding to one or more wells to generate a model of a fracture network specific to the one or more wells. This model of a fracture network, or a fracture network model, may be used to analyze data acquired by the data acquisition unit 890, including, for example, subsurface data and may be modified based, at least in part, on receipt of subsurface data. In step 907, subsurface data may be analyzed. In one or more embodiments, the fracture network model fracture network model may be updated based, at least in part, on this analysis. The fracture network model may incorporate data measured by one or more sensing systems, including data from the fiber optic sensors including one or more crosswell fluid interaction effects, microseismic, temperature, and strain data. These data may be used to constrain the solution. Because there is often uncertainty in many of the fracture network model input parameters, the response of the well as indicated by one or more of crosswell fluid interaction effects, microseismic, temperature, and strain data, where one or more of these effects and data may be used to constrain the calculated fracture network model parameters to modify the model to improve its accuracy and ability to predict and represent the physical well, fracture, and reservoir system. These improvements enable the fracture network model to identify fractures and the features of these fractures including, for example, fracture orientation, complexity, height, length, and growth rates. In one or more embodiments, the fracture network model may be modified based, at least in part, on well treatment data corresponding to the one or more parameters corresponding to wells specific to the fracture network model including, for example, fluid rates, proppant rates, proppant sizes, diversion rates, diversion volumes, diverter sizes, chemical types, chemical rates, and chemical volumes. In one or more embodiments, process 900 may return to and repeat steps 901-907, which may be performed iteratively to improve the quality and the accuracy of the fracture network model.

In step 909, one or more well interference events may be identified based, at least in part, on the fracture network model. For example, the fracture network model may detect an arrival time and distance along the wellbore where pressure is detected. The fracture network model may predict one or more well interference events, including, for example, where and when a well interference event may occur, and where a fracture may intersect another well. In one or more embodiments, fracture network models may be used for prediction of any one or more of future fracture growth, hydraulic pressure, poroelastic pore pressure, strain in any direction, stress in any direction, and enable an improved understanding of completion-related effects. A fracture network model may enable simulation of multiple scenarios to permit selection of an improved or optimized stage plan for one or more subsequent fracturing stages. Accordingly, the system comprising a fracture network model may improve on existing oil and gas production implementations by permitting optimization of one or more fracturing stages including, for example, by minimizing well interference events.

In one or more embodiments, the fracture network model may comprise one or more sophisticated fracture network models, including, for example, proprietary fracture network models such as the Complex Fracture network model. Sophisticated fracture network models may be capable of calculating fracture dimensions, rock strain, rock stress, hydraulic pressure, and poroelastic pore pressure in addition to pressure response to a fracture treatment injection. Simplified models, including, for example, an elliptical parametric model, which may describe a fracture network as a whole, may be incapable of calculating the detailed stress, strain, hydraulic, and poroelastic pore pressure response along the wellbore in the formation. The present disclosure enables the simultaneous calculation of both the hydraulic and poroelastic pressure response in a coupled manner for any combination of treatments, offsets, and monitoring wells which is an improvement to existing technologies. The fracture network model may be a forward model and actual responses may be matched by adjusting input parameters such as rock, petrophysical, and friction properties. In the same way, the fracture network model may calculate a poroelastic pressure response outside of the casing along the wellbore of the monitoring well, which may be matched to a pressure response measured by the optical fiber with pressure sensing points. The strain along the wellbore calculated by the fracture network model may be matched to strain from microdeformation strain monitoring. This data may provide constraints to the fracture network model solution that enables more accurate fracture matching. Further, the fracture network model enables the fracture matching process to be optimized using automated matching and iterative processes.

In one or more embodiments, the fracture network model, which may incorporate reservoir flow effects, may enable calculation of one or more crosswell fluid interaction effects, including, for example, one or more of a subsurface poroelastic effect, a fracture leakoff effect, a reservoir fluid flow effect, and a hydraulic connection effect, thereby generating a specific model of the specific fracture network. Dynamic subsurface poroelastic effects may enable determination of fluid movement in the porous medium of the subsurface formation, and, therefore, may enable responses that limit or eliminate potential detrimental effects including frac hits and unintended hydraulic connections. If a frac hit or hydraulic connection occurs, the fracture network model may enable determination of one or more fracture leakoff effects and one or more hydraulic connection effects including reductions in subsurface pressure, flow rates, and other production data. The complex fracture network model may enable determination of hydraulic flow effects, including where and how fluid is moving subsurface.

In step 911, one or more fracturing treatment optimization actions, including, for example, well interference mitigation actions, may be recommended based, at least in part, on the fracture network model. In step 913, one or more of the one or more fracturing treatment optimization actions may be effected. In one or more embodiments, the treatment of one or more of the treatment well and the monitoring well may be altered by, for example, modifying one or more parameters, including, for example, fluid rates, proppant rates, proppant sizes, diversion rates, diversion volumes, diverter sizes, chemical types, chemical rates, and chemical volumes. In one or more embodiments, the fracture network model may suggest one or more of these modifications and these modifications may be effected manually. In one or more embodiments, the fracture network model may suggest and effect modifications automatically. In one or more embodiments, modifications may involve a combination of manual inputs and automatic processes. In one or more embodiments, after enabling modifications to the treatment of one or more of the treatment well and the monitoring well to reduce or eliminate well interference, process 900 may return to step 901 and repeat one or more of the steps of process 900. In one or more embodiments, a computing device may enable one or more of the steps disclosed in FIG. 9. For example, the computing device 1000 discussed below with FIG. 10 may comprise one or more applications or modules associated with the implementing the fracture network model, with the analysis of the subsurface data and well treatment data, with suggesting fracturing treatment optimization actions, and with effecting fracturing treatment optimization actions.

Fracturing treatment optimization actions may include actions in the treatment well, the monitoring well, or both. For example, in the monitoring well, mitigation actions may include pumping additional fluid downhole, which may increase pressure in the monitoring well. Additional mitigation actions in the monitoring well may include adding one or more diverter materials, chemicals, and other materials to the injected fluid to selectively control fluid inflow along the monitoring well. These mitigation actions in the monitoring well may attempt to control any resulting subsurface pressure increase such that the pressure differential between the fracture and the monitoring well may be controlled to mitigate well interference effects.

Similarly, in one or more embodiments, fracturing treatment optimization actions in the treatment well may include modifying fluid flow rates. For example, depending on the scenario, mitigation actions may include modifying fluid flow rates, including, for example, increasing and decreasing fluid flow rates, introducing periodic oscillations in the fluid flow rates, removing periodic oscillations in the fluid flow rates, and modifying the rates of the periodic oscillations in the fluid flow rates. Additional mitigation actions may include varying proppant concentration and proppant size, introducing diverter materials, and introducing chemicals to the fluid pumped downhole in the treatment well. These mitigation actions to treatment of the monitoring well may change the pressure distribution along the wellbore and fractures. These controllable changes in pressure resistance between the surface treatment pressure and the fracture may mitigate or reduce the possibility of frac hits.

In one or more embodiments, the system may measure low frequency strain along the wellbore for microdeformation monitoring, such that individual fractures may be determined from a complex strain profile through an inversion model. In one or more embodiments, the low frequency strain data may be a filtered low frequency data range from a higher frequency data set collected by a Distributed Acoustic Sensing (DAS) system. In one or more embodiments, the strain data may be any strain data measured using any one or more of Brillouin scattering, Rayleigh scattering, direct wavelength detection using FBG sensors, and other sensing principles based, at least in part, on interferometry. In one or more embodiments, the inversion model may incorporate any one or more of treatment well data, the fracture network model, and data from any sensing system installed. The measured strain along the wellbore of the monitoring well may indicate where fractures and fracture fields are approaching the monitoring well. The measured strain may also indicate formation stress changes at the edges of a fracture field. An improved understanding of formation stress and stress shadowing may enable improved fracturing treatments.

In one or more embodiments, microseismic information that may be inferred from one or more of DAS data, and other interferometric sensing data including, for example, Fabry-Perot-based interferometric sensing using two or more FBGs to form interferometers, any TDM-based interferometric sensing technology, and any WDM-based interferometric sensing technology, and any combination of TDM/WDM-based interferometric sensing technology. The microseismic information may include azimuth, calculated fracture lengths, calculated fracture widths, and calculated fracture heights, the complexity of fractures, fracture growth over time, and other related information. Microseismic events may occur near the tip of a fracture as the subsurface formation fractures. Microseismic events may also occur where formation stress changes. A good understanding of formation stress and stress shadowing may enable improved fracturing treatments.

Optical fibers may be single-mode fibers or multi-mode fibers. A fiber optic sensing system may be connected to the optical fibers. The sensing system may comprise one or more of a Distributed Temperature Sensing (DTS) system, a Distributed Acoustic Sensing (DAS) system, and a Distributed Strain Sensing (DSS) system. Additionally, the sensing system may comprise a quasi-distributed sensing system, where multiple single point sensors are distributed along an optical fiber, or a single point sensing system, where sensors are located at the end of the fiber.

Fiber optic sensing systems may operate using a variety of sensing principles. Sensing systems include but are not limited to amplitude-based sensing systems, including, for example, DTS systems based on Raman scattering; phase sensing-based systems, including, for example, DAS systems; interferometric sensing systems, including, for example, homodyne or heterodyne techniques where the system may sense phase or intensity changes due to constructive or destructive interference; strain sensing systems, including, for example, DSS using dynamic strain measurements based on interferometric sensors; static strain sensing measurements, including, for example, Brillouin scattering; quasi-distributed sensors, including, for example, FBGs where a wavelength shift is detected and multiple FBGs that may form Fabry-Perot type interferometric sensors for phase- or intensity-based sensing; and single point fiber optic sensors, including, for example, Fabry-Perot-, FBG-, and intensity-based sensors.

In one or more embodiments, electrical sensors may be pressure sensors including quartz-type sensors, strain gauge-based sensors, and other commonly used sensing technologies. Pressure sensors, including optical and electrical sensors, may be housed in dedicated gauge mandrels or attached outside the casing in various configurations for down-hole deployment. Additionally, pressures sensors may be deployed conventionally at the surface well head or flow lines.

In one or more embodiments, a hybrid approach may be desirable, including, for example, a combination of one or more single-point, one or more quasi-distributed, and one or more distributed fiber optic sensors are mixed with, for example, one or more electrical sensors. The optical fiber may then include one or more optical fibers and one or more electrical conductors.

In one or more embodiments, temperature measurements from, for example, a DTS system may be used to determine locations of fluid flow near the sensors. For example, fluids from the surface may be cooler than formation temperatures. DTS warm-back analyses may be used to determine fluid volume placement. DTS warm-back analyses may be used for water injection wells and for fluid placement for treatment of a treatment well. Temperature measurements in a monitoring well may be used to determine well interference, including, for example, fluid interactions between the treatment well and monitoring well. Additionally, temperature measurements in a monitoring well may be used to determine formation fluid movement.

In one or more embodiments, DAS data may be used to determine fluid allocation in real-time as acoustic noise is generated when fluid flows through the casing and through perforations in the casing into the formation. Phase- and intensity-based interferometric sensing systems are sensitive to temperature, mechanical, and acoustically-induced vibrations. DAS data may be converted from time series data to frequency domain data using transforms, including, for example, Fast Fourier Transforms (FFT) and wavelet transforms, to generate different representations of the data. Various frequency ranges may be used for different purposes and each indicator may have a characteristic signature in terms of one or more of frequency content, amplitude, and time-dependent behavior. In one or more embodiments, for example, low frequency signal changes may be attributed to formation strain changes or fluid movement. Other frequency ranges may be indicative of fluid or gas movement. Various filtering techniques may be applied to generate indicators of events of interest. Event indicators may indicate formation movement due to growing natural fractures and formation stress changes during the fracturing operations. Event indicators may also indicate fluid seepage during the fracturing operation as formation movement may force fluid into a monitoring well, as well as fluid flow from fractures and one or more of fluid and proppant flow resulting from frac hits. Event indicators may also be present in other data types and not limited to DAS data.

In one or more embodiments, DAS systems may be used to detect various seismic events, where one or more of stress fields and growing fracture networks generate microseimic events, and where perforation charge events may be used to determine travel time between horizontal wells. This information may be used from stage to stage to determine changes in travel time as the formation is fractured and filled with fluid and proppant. The DAS systems may also be used with surface seismic sources to generate vertical seismic profiles before, during, and after a fracturing job to determine the effectiveness of the fracturing job as well as determine production effectiveness.

In one or more embodiments, static strain data may be used to determine absolute strain changes over time, where strain data may be acquired using various DSS systems. In one or more embodiments, static strain data may be measured using Brillouin-based systems. In one or more embodiments, quasi-distributed strain data may be measured using FBG-based systems. Static strain may also be used to determine propped fracture volume by comparing deviations in strain data to a measured strain pre-fracturing baseline. It may also be possible to determine formation properties like permeability, poroelastic responses, and leak off rates based, at least in part, on changes in the measured strain data over time and the rate at which the measured strain data changes over time. Dynamic strain data may be used in real-time to detect and predict fracture growth using an appropriate inversion model.

In one or more embodiments, sensors may be used to measure well interactions by placing them along either the treatment well, along the monitoring well, or along both wells. One or more parameters, including, for example, the treatment well pressure, rate, proppant concentration, diverters, fluids and chemicals may be altered to change the hydraulic fracturing treatment. These changes may impact the formation responses in several different ways. For example, in one or more embodiments, stress fields may change, and this may generate microseismic effects that may be measured with one or more of DAS systems and single point seismic sensors like geophones. Fracture growth rates may change, which may be measured as microseismic events and event distributions over time, or as changes in the measured strain using the low frequency portion of a DAS signal or Brillouin-based sensing systems. Pressure changes due to one or more crosswell fluid interaction effects may be measured in the monitoring well. Pressure data may be measured in the treatment well and correlated to formation responses. Various changes in treatment rates and pressure may generate events that may be correlated to fracture growth rates Several measurements may be combined to determine adjacent well interactions, and this information may be used to modify one or more fracturing treatment optimization actions to generate desired outcomes. For example, the measurement data captured by these sensors may be combined with a subsurface fracture network model to improve real-time analytics and make predictions about how to optimize oil and gas production. Real-time subsurface data enables operators, automatic systems, or a combination of both to mitigate detrimental subsurface effects by taking appropriate actions. Appropriate actions may include, for example, modifying one or more parameters associated with treatment of a treatment well, a monitoring well, or both a treatment and a monitoring well. As described herein, modifying one or more parameters may comprise modifying a hydraulic fracturing treatment schedule, dynamically changing fluid flow rates to a treatment well, a monitoring well, or both a treatment and a monitoring well, adding one or more diverters or chemicals into the fracturing fluid, and changing proppant concentrations and types.

Any one or more embodiments of the present disclosure may be implemented through a computer-executable program of instructions, such as program modules, generally referred to as software applications or application programs executed by a computer. A software application may include, for example, routines, programs, objects, components, data structures, any other executable instructions, or any combination thereof, that perform particular tasks or implement particular abstract data types. The software application may form an interface to allow a computer to react according to a source of input. For example, an interface application may be used to implement any one or more embodiments of the present disclosure. The software application may also cooperate with other applications or code segments to initiate a variety of tasks based, at least in part, on data received, a source of data, or any combination thereof. Other applications or code segments may provide optimization components including, but not limited to, neural networks, earth modeling, history-matching, optimization, visualization, data management, and economics. The software application may be stored, carried, or both on any variety of memory such as CD-ROM, magnetic disk, optical disk, bubble memory, and semiconductor memory (for example, various types of RAM or ROM). Furthermore, the software application and one or more inputs or outputs may be transmitted over a variety of carrier media including, but not limited to wireless, wired, optical fiber, metallic wire, telemetry, any one or more networks (such as the Internet), or any combination thereof.

Moreover, those skilled in the art will appreciate that one or more of the embodiments may comprise a variety of computer-system configurations, including hand-held devices, multiprocessor systems, microprocessor-based or programmable consumer electronics, minicomputers, mainframe computers, and any combination thereof. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and remote computer-storage media including memory storage devices. The present disclosure may, therefore, be implemented in connection with various hardware, software, or any combination thereof, in a computer system, information handling system, or other processing system.

Figure 10:
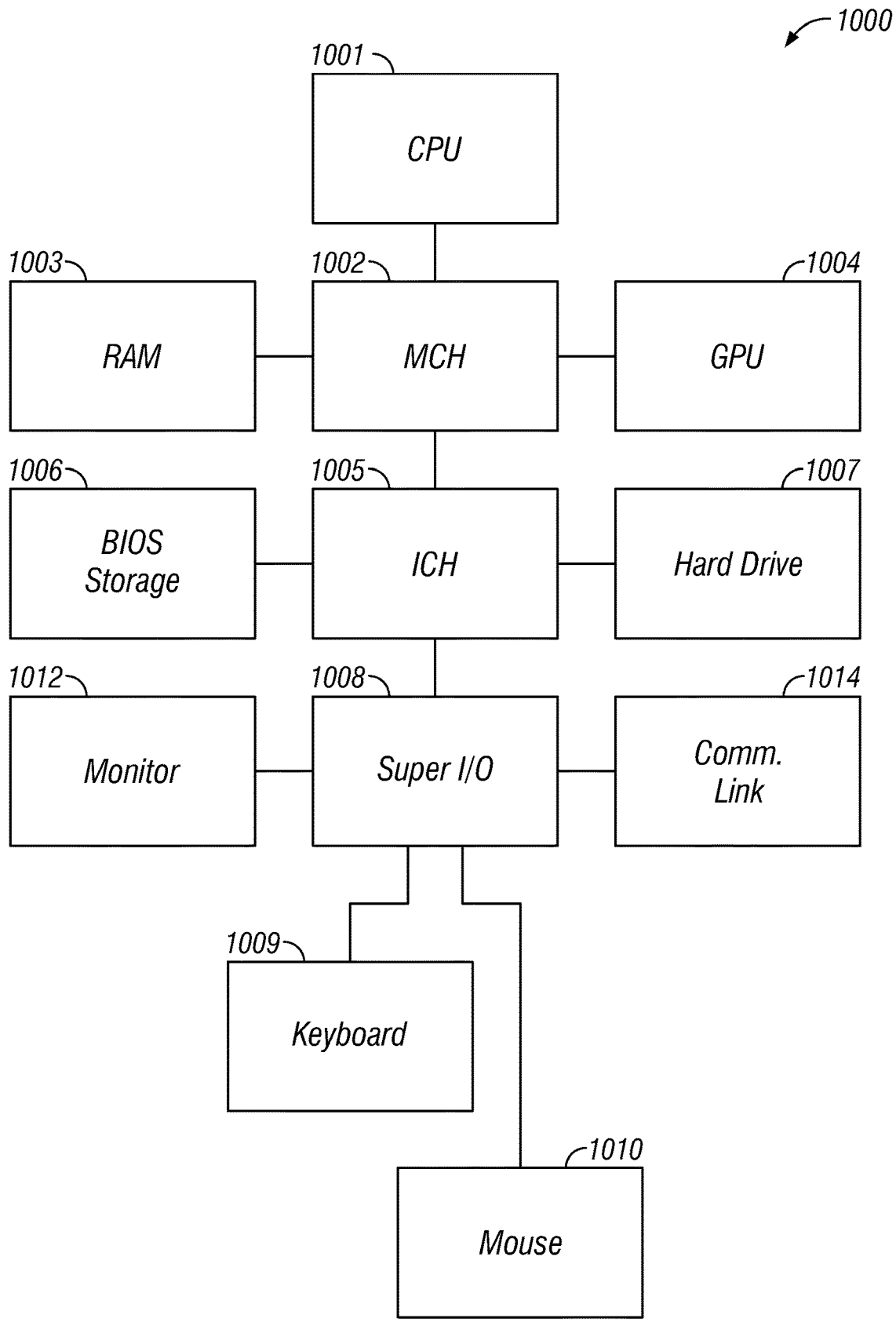
FIG. 10 is a block diagram of features of an example system operable to control installation of an optical fiber downhole in a well at a well site, in accordance with one or more embodiments.

Referring now to FIG. 10, a block diagram illustrates one embodiment of a system for implementing one or more embodiments of the present invention. The system includes a computing device 1000, sometimes referred to as a computing system or information handling system, which comprises memory such as random access memory (RAM) 1003, application programs (not shown here), a user interface 1008 comprising a mouse 1010 and a keyboard 1009, a video interface 1004, and a central processing unit (CPU) 901. The CPU 1001, the video interface 1004, and the RAM 1003 may be connected a memory controller hub (MCH) 1002. The system may also include one or more storage devices, such as a read-only memory (ROM) storage element containing instructions for a basic input and output system (BIOS) 1006 and a hard drive 1007. The ROM 1006, the hard drive 1007, and the user interface 1008 may be connected to one another via an input/output controller hub (ICH) 1005. The MCH 1002 and ICH 1005 may be connected to one another. The computing device 1000 is only one example of a suitable computing environment and is not intended to suggest any limitation as to the scope of use or functionality of the disclosure.

A memory or storage device primarily stores one or more software applications or programs, which may also be described as program modules containing computer-executable instructions, which may be executed by the computing unit for implementing one or more embodiments of the present disclosure. The memory, therefore, may include one or more applications including, for example, a data collection application and a subsurface fracture network modeling application, which may enable one or more of the processes or sub-processes illustrated in FIG. 9. These applications may integrate functionality from additional or third-party application programs or from system files stored in memory or on a storage device. An application may perform one or more of the steps in FIG. 9. System files, such as an ASCII text file may be used to store the instructions, data input, or both for the reservoir simulator as may be required in, for example, one or more steps of FIG. 9 discussed herein. In one or more embodiments, any one or more other applications may be used in combination. In one or more embodiments, any one or more other applications may be used as stand-alone applications.

Although the computing device 1000 is shown as having one or more generalized memories, the computing device 1000 may include a variety of non-transitory computer readable media. By way of example, and not limitation, non-transitory computer readable media may comprise computer storage media and communication media. The memory may include computer storage media, such as a ROM and RAM in the form of volatile memory, nonvolatile memory, or both. A BIOS containing the basic routines that help to transfer information between elements within the computing unit, such as during start-up, may be stored in the ROM. RAM may contains data, program modules, other executable instructions, or any combination thereof that are immediately accessible to, presently being operated on, or both by the processing unit. By way of example, and not limitation, the computing device 1000 may include an operating system, application programs, other program modules, and program data.

The components shown in the memory may also be included in other removable/non-removable, volatile/non-volatile non-transitory computer storage media or the components may be implemented in the computing device 1000 through an application program interface ("API") or cloud computing, which may reside on a separate computing device connected through a computer system or network (not shown). For example only, a hard disk drive may read from or write to non-removable, nonvolatile magnetic media, a magnetic disk drive may read from or write to a removable, nonvolatile magnetic disk, and an optical disk drive may read from or write to a removable, nonvolatile optical disk such as a CD-ROM or other optical media. Other removable/non-removable, volatile/nonvolatile computer storage media that may be used in the exemplary operating environment may include, but are not limited to, magnetic tape cassettes, flash memory cards, digital versatile disks, digital video tape, solid state RAM, solid state ROM, or the like. The drives and their associated computer storage media discussed above provide storage of computer readable instructions, data structures, program modules, and other data for the computing unit.

The computing device 1000 may receive commands or information from a user through the user interface 1008 and the associated input devices such as a keyboard 1009 and a mouse 1010. Input devices may comprise a microphone, joystick, satellite dish, scanner, voice or gesture recognition, and the like (not shown). These and other input devices are often connected to the processing unit through the user interface 1008 that is coupled to the ICH 1005, but may be connected by other interface and bus structures, such as a parallel port or a universal serial bus (USB) (not shown).

A monitor or other type of display device 1012 may be connected to the MCH 1002 via an interface, such as a video interface 1004. A graphical user interface ("GUI") may also be used with the video interface 1004 to receive instructions from the user interface 1008 and transmit instructions to the central processing unit 1001. A GUI may be used to display the outputs of the processes described in FIG. 9, and may be used to prompt or display modification of subsurface operations or production activities. In addition to the video interface 1004, the computing device 1000 may also include other peripheral output devices such as speakers, printer, external memory, any other device, or any combination thereof (not shown), which may be connected through an output peripheral interface (not shown), such as a communication link 1014.

Although many other internal components of the computing device 1000 are not shown, those of ordinary skill in the art will appreciate that such components and their interconnection are well known.

Examples of the above embodiments include:

Example 1. A wellbore optical fiber measurement system for measuring data in a lateral wellbore, comprising: a flexible optical fiber comprising a waveguide coated with a coating, wherein the optical fiber has an effective density $\rho_{eff_{fiber}}$ and an effective axial Young modulus $E_{eff_{fiber}}$ and wherein the product $$\left(\frac{\rho_{eff_{fiber}}}{E_{eff_{fiber}}}\right) \cdot \left(1 - \frac{\rho_{water}}{\rho_{eff_{fiber}}}\right)$$

is greater than 50 kg/m$^3$/GPa; and a data acquisition unit comprising a processor operable to obtain strain measurement data of the wellbore from the optical fiber.

Example 2. The system of Example 1, wherein the optical fiber comprises an acrylate-coated optical fiber overcoated with a material comprising a polymer wherein a density of the material is greater than 1000 kg/m$^3$.

Example 3. The system of Example 1, wherein the optical fiber comprises an acrylate-coated optical fiber overcoated with a material comprising a polymer and a filler wherein a density of the material is greater than 1000 kg/m$^3$.

Example 4. The system of Example 3, wherein the material comprises a volume fraction selected to maximize the value of $$\left(\frac{\rho}{E}\right)$$

of me material.

Example 5. The system of Example 3, wherein the material comprises a volume fraction selected to maximize the product $$\left(\frac{\rho_{eff_{fiber}}}{E_{eff_{fiber}}}\right) \cdot \left(1 - \frac{\rho_{water}}{\rho_{eff_{fiber}}}\right)$$

of the optical fiber for an outer diameter of the optical fiber.

Example 6. The system of Example 3, wherein the wellbore includes a wellbore fluid having a wellbore fluid density $\rho_{fluid}$ and wherein the polymer material comprises a volume fraction selected to maximize the value of $$\left(\frac{\rho_{eff_{fiber}}}{E_{eff_{fiber}}}\right) \cdot \left(1 - \frac{\rho_{fluid}}{\rho_{eff_{fiber}}}\right)$$

of the optical fiber for an outer diameter of the optical fiber and the wellbore fluid density $\rho_{fluid}$.

Example 7. The system of Example 1, wherein the product $$\left(\frac{\rho_{eff_{fiber}}}{E_{eff_{fiber}}}\right) \cdot \left(1 - \frac{\rho_{water}}{\rho_{eff_{fiber}}}\right)$$

is greater than 100 kg/m$^3$/GPa.

Example 8. A method of measuring strain in a lateral wellbore in a subterranean formation, the method comprising: disposably installing a flexible optical fiber, comprising a waveguide coated with a coating, in the wellbore so as to be strain coupled with a wall of the wellbore; and interrogating the optical fiber with a data acquisition unit to measure strain experienced by the wellbore wall; wherein the optical fiber has an effective density $\rho_{eff_{fiber}}$ and an effective axial Young modulus $E_{eff_{fiber}}$; and wherein the product $$\left(\frac{\rho_{eff_{fiber}}}{E_{eff_{fiber}}}\right) \cdot \left(1 - \frac{\rho_{water}}{\rho_{eff_{fiber}}}\right)$$

is greater than 50 kg/m$^3$/GPa.

Example 9. The method of Example 8, wherein the optical fiber comprises an acrylate-coated optical fiber overcoated with a material comprising a polymer wherein a density of the material greater than 1000 kg/m$^3$.

Example 10. The method of Example 8, wherein the optical fiber comprises an acrylate-coated optical fiber overcoated with a material comprising a polymer and a filler wherein a density of the material is greater than 1000 kg/m$^3$.

Example 11. The method of Example 10, wherein the material comprises a volume fraction selected to maximize the value of $$\left(\frac{\rho}{E}\right)$$

of the material.

Example 12 The method of Example 10, wherein the polymer material comprises a volume fraction selected to maximize the value of $$\left(\frac{\rho_{eff_{fiber}}}{E_{eff_{fiber}}}\right) \cdot \left(1 - \frac{\rho_{water}}{\rho_{eff_{fiber}}}\right)$$

of the optical fiber for an outer diameter of the optical fiber.

Example 13. The method of Example 10, wherein the wellbore includes a wellbore fluid having a wellbore fluid density $\rho_{fluid}$ and wherein the material comprises a volume fraction selected to maximize the value of $$\left(\frac{\rho_{\mathit{eff\,fiber}}}{E_{\mathit{eff\,fiber}}}\right)\cdot\left(1-\frac{\rho_{\mathit{fluid}}}{\rho_{\mathit{eff\,fiber}}}\right)$$

of the optical fiber for an outer diameter of the optical fiber and the wellbore fluid density $\rho_{fluid}$.

Example 14. The method of Example 8, the product $$\left(\frac{\rho_{\mathit{eff\,fiber}}}{E_{\mathit{eff\,fiber}}}\right)\cdot\left(1-\frac{\rho_{\mathit{water}}}{\rho_{\mathit{eff\,fiber}}}\right)$$

is greater than 100 kg/m³/GPa.

Example 15. A system for fracturing a first lateral wellbore in a subterranean formation with a second lateral wellbore proximate the first wellbore, comprising: wellbore fracturing equipment comprising one or more frac pumps; a flexible optical fiber comprising a waveguide coated with a coating, wherein the optical fiber has an effective density $\rho_{\mathit{eff\,fiber}}$ and an effective axial Young modulus $E_{\mathit{eff\,fiber}}$ and wherein the product $$\left(\frac{\rho_{\mathit{eff\,fiber}}}{E_{\mathit{eff\,fiber}}}\right)\cdot\left(1-\frac{\rho_{\mathit{water}}}{\rho_{\mathit{eff\,fiber}}}\right)$$

is greater than 100 kg/m³/GPa; a data acquisition unit comprising a processor operable to obtain strain measurement data of the wellbore from the optical fiber; a control system operable to control the wellbore fracturing equipment based on the data obtained by the data acquisition unit.

Example 16. The system of Example 15, wherein the optical fiber comprises an acrylate-coated optical fiber overcoated with a material comprising a polymer wherein a density of the material is greater than 1000 kg/m³.

Example 17. The system of Example 15, wherein the optical fiber comprises an acrylate-coated optical fiber overcoated with a material comprising a polymer and a filler wherein a density of the material is greater than 1000 kg/m³.

Example 18. The system of Example 17, wherein the material comprises a volume fraction selected to maximize the value of $$\left(\frac{\rho}{E}\right)$$

of the material.

Example 19. The system of Example 17, wherein the material comprises a volume fraction selected to maximize the value of $$\left(\frac{\rho_{\mathit{eff\,fiber}}}{E_{\mathit{eff\,fiber}}}\right)\cdot\left(1-\frac{\rho_{\mathit{water}}}{\rho_{\mathit{eff\,fiber}}}\right)$$

of the optical fiber for an outer diameter of the optical fiber.

Example 20. The system of Example 17, wherein the wellbore includes a wellbore fluid having a wellbore fluid density $\rho_{fluid}$ and wherein the material comprises a volume fraction selected to maximize the value of $$\left(\frac{\rho_{\mathit{eff\,fiber}}}{E_{\mathit{eff\,fiber}}}\right)\cdot\left(1-\frac{\rho_{\mathit{fluid}}}{\rho_{\mathit{eff\,fiber}}}\right)$$

of the optical fiber for an outer diameter of the optical fiber and the wellbore fluid density $\rho_{fluid}$.

Certain terms are used throughout the description and claims to refer to particular features or components. As one skilled in the art will appreciate, different persons may refer to the same feature or component by different names. This document does not intend to distinguish between components or features that differ in name but not function.

For the embodiments and examples above, a non-transitory computer readable medium can comprise instructions stored thereon, which, when performed by a machine, cause the machine to perform operations, the operations comprising one or more features similar or identical to features of methods and techniques described above. The physical structures of such instructions may be operated on by one or more processors. A system to implement the described algorithm may also include an electronic apparatus and a communications unit. The system may also include a bus, where the bus provides electrical conductivity among the components of the system. The bus can include an address bus, a data bus, and a control bus, each independently configured. The bus can also use common conductive lines for providing one or more of address, data, or control, the use of which can be regulated by the one or more processors. The bus can be configured such that the components of the system can be distributed. The bus may also be arranged as part of a communication network allowing communication with control sites situated remotely from system.

In various embodiments of the system, peripheral devices such as displays, additional storage memory, and/or other control devices that may operate in conjunction with the one or more processors and/or the memory modules. The peripheral devices can be arranged to operate in conjunction with display unit(s) with instructions stored in the memory module to implement the user interface to manage the display of the anomalies. Such a user interface can be operated in conjunction with the communications unit and the bus. Various components of the system can be integrated such that processing identical to or similar to the processing schemes discussed with respect to various embodiments herein can be performed.

While descriptions herein may relate to "comprising" various components or steps, the descriptions can also "consist essentially of" or "consist of" the various components and steps.

Unless otherwise indicated, all numbers expressing quantities are to be understood as being modified in all instances by the term "about" or "approximately". Accordingly, unless indicated to the contrary, the numerical parameters are approximations that may vary depending upon the desired properties of the present disclosure.

The embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

What is claimed is:

1. A wellbore optical fiber measurement system for measuring data in a lateral wellbore, comprising:
   a flexible optical fiber comprising a waveguide coated with a coating, wherein the optical fiber has an effective density $\rho_{\mathit{eff}_{fiber}}$ and an effective axial Young modulus $E_{\mathit{eff}_{fiber}}$ and wherein a strain coupling parameter comprises the product $$\left(\frac{\rho_{\mathit{eff}_{fiber}}}{E_{\mathit{eff}_{fiber}}}\right)\cdot\left(1-\frac{\rho_{water}}{\rho_{\mathit{eff}_{fiber}}}\right)$$

and is greater than 100 kg/m³/GPa under downhole conditions; and
   a data acquisition unit comprising a processor operable to obtain strain measurement data of the wellbore from the optical fiber.

2. The system of claim 1, wherein the optical fiber comprises an acrylate-coated optical fiber overcoated with a material comprising a polymer wherein a density of the material is greater than 1000 kg/m³.

3. The system of claim 1, wherein the optical fiber comprises an acrylate-coated optical fiber overcoated with a material comprising a polymer and a filler wherein a density of the material is greater than 1000 kg/m³.

4. The system of claim 3, wherein the material comprises a volume fraction selected to maximize the value of $$\left(\frac{\rho}{E}\right)$$

of the material.

5. The system of claim 3, wherein the material comprises a volume fraction selected to maximize the strain coupling parameter of the optical fiber for an outer diameter of the optical fiber.

6. The system of claim 3, wherein the wellbore includes a wellbore fluid having a wellbore fluid density $\rho_{fluid}$ and wherein the polymer material comprises a volume fraction selected to maximize the strain coupling parameter of the optical fiber for an outer diameter of the optical fiber and the wellbore fluid density $\rho_{fluid}$.

7. The system of claim 1, wherein a roughness of an outer surface of the optical fiber is manipulated to increase a friction coefficient of the optical fiber.

8. A method of measuring strain in a lateral wellbore in a subterranean formation, the method comprising:
   disposably installing a flexible optical fiber, comprising a waveguide coated with a coating, in the wellbore so as to be strain coupled with a wall of the wellbore; and
   interrogating the optical fiber with a data acquisition unit to measure strain experienced by the wellbore wall;
   wherein the optical fiber has an effective density $\rho_{\mathit{eff}_{fiber}}$ and an effective axial Young modulus $E_{\mathit{eff}_{fiber}}$; and
   wherein a strain coupling parameter comprises the product $$\left(\frac{\rho_{\mathit{eff}_{fiber}}}{E_{\mathit{eff}_{fiber}}}\right)\cdot\left(1-\frac{\rho_{water}}{\rho_{\mathit{eff}_{fiber}}}\right)$$

and is greater than 100 kg/m³/GPa under downhole conditions.

9. The method of claim 8, wherein the optical fiber comprises an acrylate-coated optical fiber overcoated with a material comprising a polymer wherein a density of the material greater than 1000 kg/m³.

10. The method of claim 8, wherein the optical fiber comprises an acrylate-coated optical fiber overcoated with a material comprising a polymer and a filler wherein a density of the material is greater than 1000 kg/m³.

11. The method of claim 10, wherein the material comprises a volume fraction selected to maximize the value of $$\left(\frac{\rho}{E}\right)$$

of the material.

12. The method of claim 10, wherein the polymer material comprises a volume fraction selected to maximize the strain coupling parameter of the optical fiber for an outer diameter of the optical fiber.

13. The method of claim 10, wherein the wellbore includes a wellbore fluid having a wellbore fluid density $\rho_{fluid}$ and wherein the material comprises a volume fraction selected to maximize the strain coupling parameter of the optical fiber for an outer diameter of the optical fiber and the wellbore fluid density $\rho_{fluid}$.

14. The method of claim 8, wherein a roughness of an outer surface of the optical fiber is manipulated to increase a friction coefficient of the optical fiber.

15. A system for fracturing a first lateral wellbore in a subterranean formation with a second lateral wellbore proximate the first wellbore, comprising:
    wellbore fracturing equipment comprising one or more frac pumps operable to frac the first lateral wellbore;
    a flexible optical fiber located in the second lateral wellbore and comprising a waveguide coated with a coating, wherein the optical fiber has an effective density $\rho_{\mathit{eff}_{fiber}}$ and an effective axial Young modulus $E_{\mathit{eff}_{fiber}}$ and wherein a strain coupling parameter comprises the product $$\left(\frac{\rho_{\mathit{eff}_{fiber}}}{E_{\mathit{eff}_{fiber}}}\right)\cdot\left(1-\frac{\rho_{water}}{\rho_{\mathit{eff}_{fiber}}}\right)$$

and is greater than 100 kg/m³/GPa under downhole conditions;
    a data acquisition unit comprising a processor operable to obtain strain measurement data of the second lateral wellbore from the optical fiber;
    a control system operable to control the wellbore fracturing equipment based on the data obtained by the data acquisition unit.

16. The system of claim 15, wherein the optical fiber comprises an acrylate-coated optical fiber overcoated with a material comprising a polymer wherein a density of the material is greater than 1000 kg/m³.

17. The system of claim 15, wherein the optical fiber comprises an acrylate-coated optical fiber overcoated with a material comprising a polymer and a filler wherein a density of the material is greater than 1000 kg/m³.

18. The system of claim 17, wherein the material comprises a volume fraction selected to maximize the value of $$\left(\frac{\rho}{E}\right)$$

of me material.

19. The system of claim 17, wherein the material comprises a volume fraction selected to maximize the strain coupling parameter of the optical fiber for an outer diameter of the optical fiber.

20. The system of claim 17, wherein the wellbore includes a wellbore fluid having a wellbore fluid density $\rho_{fluid}$ and wherein the material comprises a volume fraction selected to maximize the strain coupling parameter of the optical fiber for an outer diameter of the optical fiber and the wellbore fluid density $\rho_{fluid}$.

* * * * *

UNITED STATES PATENT AND TRADEMARK OFFICE
CERTIFICATE OF CORRECTION

PATENT NO. : 11,549,369 B1
APPLICATION NO. : 17/643755
DATED : January 10, 2023
INVENTOR(S) : Michel LeBlanc and Mikko K. Jaaskelainen It is certified that error appears in the above-identified patent and that said Letters Patent is hereby corrected as shown below:

In the Claims

Claim 18, Column 32, Line 65: "$\left(\frac{p}{\varepsilon}\right)$ of me material." should read "$\left(\frac{p}{\varepsilon}\right)$ of the material."

Signed and Sealed this
Seventh Day of March, 2023

Katherine Kelly Vidal
Director of the United States Patent and Trademark Office